US011598261B2

(12) United States Patent
Berry

(10) Patent No.: US 11,598,261 B2
(45) Date of Patent: Mar. 7, 2023

(54) RE-CONDENSING POWER CYCLE FOR FLUID REGASIFICATION

(71) Applicant: JUST IN TIME ENERGY CO., Wilmington, DE (US)

(72) Inventor: James E. Berry, Cherry Hill, NJ (US)

(73) Assignee: JUST IN TIME ENERGY CO., Wilmington, DE (US)

( * ) Notice: Subject to any disclaimer, the term of this patent is extended or adjusted under 35 U.S.C. 154(b) by 0 days.

(21) Appl. No.: 17/601,788

(22) PCT Filed: Apr. 27, 2021

(86) PCT No.: PCT/US2021/029363
§ 371 (c)(1),
(2) Date: Oct. 6, 2021

(87) PCT Pub. No.: WO2021/231078
PCT Pub. Date: Nov. 18, 2021

(65) Prior Publication Data
US 2022/0220892 A1 Jul. 14, 2022

Related U.S. Application Data

(60) Provisional application No. 62/704,495, filed on May 13, 2020.

(51) Int. Cl.
*F02C 1/00* (2006.01)
*F01K 7/12* (2006.01)
(Continued)

(52) U.S. Cl.
CPC .............. *F02C 1/002* (2013.01); *F01K 7/12* (2013.01); *F01K 7/32* (2013.01); *F01K 23/065* (2013.01);
(Continued)

(58) Field of Classification Search
CPC ... F02C 1/002; F01K 7/12; F01K 7/32; F01K 23/065; F01K 23/10; F01K 25/08; F02M 31/042; Y02E 20/16
See application file for complete search history.

(56) References Cited

U.S. PATENT DOCUMENTS 3,998,059 A * 12/1976 Randell .................. F01K 25/10
60/671
8,628,025 B2 * 1/2014 Bucknell ................. F02B 41/10
903/902
(Continued)

FOREIGN PATENT DOCUMENTS

WO       2019046430 A1      3/2019

OTHER PUBLICATIONS

International Search Report and Written Opinion for corresponding International application No. PCT/US2021/029363 dated Sep. 8, 2021 (12 pages).

*Primary Examiner* — Mickey H France
(74) *Attorney, Agent, or Firm* — Mendelsohn Dunleavy, P.C.; Steve Mendelsohn

(57) ABSTRACT

To produce power using the cold in a stored fluid in a cold condensed state (for example, LNG or liquid air), the fluid is initially pumped, heated, and expanded to generate a first amount of power and form initially expanded fluid, which is then re-condensed, re-pumped, re-heated, and re-expanded to generate a second amount of power, where the initially expanded fluid is re-condensed against the pumped fluid from the initial pumping. The technique can be used to store excess energy in the cold condensed fluid using excess energy generation capacity for subsequent recovery when energy is either deficient or otherwise more expense to generate.

32 Claims, 6 Drawing Sheets

(51) Int. Cl.
*F01K 7/32* (2006.01)
*F02M 31/04* (2006.01)
*F01K 25/08* (2006.01)
*F01K 23/10* (2006.01)
*F01K 23/06* (2006.01)

(52) U.S. Cl.
CPC .............. *F01K 23/10* (2013.01); *F01K 25/08* (2013.01); *F02M 31/042* (2013.01); *Y02E 20/16* (2013.01)

(56) References Cited

U.S. PATENT DOCUMENTS

| | | |
|---|---|---|
| 9,359,919 B1 | 6/2016 | Berry |
| 2004/0011038 A1 | 1/2004 | Stinger et al. |
| 2008/0190106 A1* | 8/2008 | Mak .................... F01K 25/06 60/531 |
| 2009/0293503 A1 | 12/2009 | Vandor |
| 2010/0205962 A1 | 8/2010 | Kalina |
| 2010/0287934 A1* | 11/2010 | Glynn .................. F28D 20/026 60/645 |
| 2015/0000280 A1 | 1/2015 | Harris et al. |
| 2015/0076831 A1 | 3/2015 | Giegel |
| 2018/0080341 A1* | 3/2018 | Batscha ................ F01D 25/162 |
| 2020/0103163 A1 | 4/2020 | Beck et al. |
| 2020/0191021 A1* | 6/2020 | Santini ................. F01K 17/005 |

* cited by examiner

400

400A

RE-CONDENSING POWER CYCLE FOR FLUID REGASIFICATION

CROSS-REFERENCE TO RELATED APPLICATIONS

This application claims the benefit of PCT application no. PCT/US2021/029363, filed on Apr. 27, 1921, which itself claims the benefit of the filing date of U.S. provisional application No. 62/704,495, filed on May 13, 1920, the teachings of both of which are incorporated herein by reference in their entirety.

BACKGROUND

Field of the Disclosure

The present disclosure relates to power generation and, more specifically but not exclusively, to the generation of electrical energy using expansion turbines and the like.

Description of the Related Art

This section introduces aspects that may help facilitate a better understanding of the disclosure. Accordingly, the statements of this section are to be read in this light and are not to be understood as admissions about what is prior art or what is not prior art.

Typically, demand for electrical power is greater during the daytime and evening hours than it is during nighttime. At nighttime, wind turbines often have the capability of generating significantly more power than required by the grid. At times during daylight hours, wind turbines and solar cells often have more generating capacity than is needed to satisfy energy demand. But, at other times during the day and very often in the evening hours (approximately 6 PM to 10 PM) when the sun has set or is very low in the sky and winds are light, fossil-fueled peaking power units are required to meet demand. This is particularly true during hot weather with high residential air conditioning load.

In order to make efficient use of excess renewable generation capacity, it would be advantageous to provide means for storing energy for later use during times when electrical power is in relatively short supply.

A typical liquefied natural gas (LNG) regasification facility uses either seawater or ambient air to provide the heat to gasify near-atmospheric-pressure LNG after pumping the LNG to high pressure, generally to a pressure (after accounting for system pressure drops) to match the pressure of the gas pipeline that is being supplied. Some systems have integrated power generation taking advantage of the cold energy in the LNG by using the LNG as a heat sink for various Rankine- or Brayton-type power cycles. Typically, these are organic Rankine cycles (ORCs), Brayton cycles, or steam Rankine cycles. More typical is the use of the cold energy to cool the inlet air to gas turbines in co-located combined-cycle power plants, thus increasing the power output. ORCs have used pentane or various refrigerants as the working fluid. These systems have relatively low efficiency due in part to the inability of using to the greatest extent the low temperature in the LNG in order to avoid a sub-atmospheric pressure in the ORC cycle.

Another method currently used to produce electrical power in an LNG regasification facility (and sometimes together with the above-mentioned power integration methods) is to pump the LNG to a pressure significantly higher than the user pipeline pressure, heat the high-pressure gasified fluid, and then expand it through a power-producing expansion device, such as an expansion turbine, down to near the user pipeline pressure. Some of these methods reduce the amount of heating required from the sea water or ambient air.

Many concepts have been suggested for producing and storing liquid air (LA) using relatively inexpensive electricity at off-peak times and subsequently using this liquid air to produce electric power at peak electrical demand times. Most concepts are similar to the last method described above for power production from LNG, where the atmospheric-pressure liquid air is pumped to a high pressure, gasified, heated, expanded through a turbine or other suitable power-producing expansion device, and, in some systems, integrating ORC power cycles using the cold available in the gasification process as a heat sink. The heat supplied to the gasified LA can come from various sources such as waste heat from a process, gas turbine exhaust heat, stored heat from the air liquefaction process, or other sources. It has been proposed that, rather than utilizing all of the cold to produce power, the cold released in the phase change process from liquid air to supercritical fluid be stored, usually in solid media such as iron ore pellets, in a high-pressure cryogenic vessel, where the stored cold is then used to reduce the power required to make the next batch of liquid air. The cost and pressure limitation of this storage vessel have a negative effect on the system economics.

Since there is no user pipeline as there is with an LNG regasification system, the high-pressure gasified and heated LA is expanded down to atmospheric pressure through a turbine or other power-producing expansion device. The temperature of this expanded stream can be as low as −200° F. depending on how high a temperature the gasified LA is heated to. This cold air can be used to cool the intake air of a gas turbine. Alternatively, the cold air itself can be (i) directed into a gas turbine inlet to increase the mass flow and power of the gas turbine and/or (ii) used to improve the performance of an ORC or Brayton power cycle.

SUMMARY

Limitations in the prior art are addressed in accordance with the principles of the present disclosure by storing excess energy in the form of a fluid in a condensed liquid state, such as liquefied natural gas (LNG) or liquid air (LA). According to certain embodiments, when additional electrical power is subsequently needed, the fluid is initially pumped, initially heated and gasified, and initially expanded in a first expansion device to generate a first amount of power. The resulting expanded fluid is then re-condensed against itself, re-pumped, re-heated, and re-expanded in a second expansion device to generate a second amount of power. For example, in certain implementations, the initially pumped fluid and the initially expanded fluid both pass through the same heat exchanger such that the initially pumped fluid is heated and the initially expanded fluid is re-condensed against itself.

When the fluid is LNG, the gaseous natural gas produced by the second expansion is directed to a gas pipeline or gas-consuming system such as a power plant. When the fluid is LA, the second expansion can be down to atmospheric pressure and the expanded gaseous air is released into the atmosphere.

Note that, for LNG applications, the initial liquefied natural gas can be from a stored source such as at an LNG import terminal, from an export terminal LNG plant, from an LNG plant dedicated for use with the proposed energy storage system, or from an existing peak-shaving LNG plant. For LA applications, the initial liquid air could be provided by a dedicated air liquefaction plant using conventional technology, or some of the liquefied air from an air separation facility could be directed to the LA power system.

Certain implementations of the present disclosure involve pumping a condensed liquefied fluid, such as LNG or LA, to a high pressure (usually between 1000-2000 psia), heating and gasifying the fluid (converting the fluid from a compressed liquid to a supercritical fluid), expanding the heated high-pressure gasified fluid in an expansion turbine or other power-producing expansion device, then re-condensing all or a portion of the expanded fluid, against the pumped cold compressed liquid fluid, to produce an intermediate-pressure fluid. The re-condensing of the gasified, heated, and expanded fluid provides the heat necessary to gasify the pumped cold compressed liquefied fluid, where this exchange of heat causes the expanded gasified fluid to re-condense. The gasifying of the pumped cold compressed liquid fluid and re-condensing of the heated and expanded fluid takes place in a gasifying/condensing heat exchanger.

The pressure of the intermediate-pressure fluid is determined by the saturation pressure of the fluid at the temperature the fluid is cooled to in the condensing side of the gasifying/condensing heat exchanger, and this temperature is dependent on the approach temperature in the heat exchanger and whether 100% of the pumped compressed liquefied fluid is re-condensed or if some of it is bypassed (less than 100% re-condensed) or some of it is recycled (more than 100% of the pumped compressed liquefied fluid is re-condensed). Assuming that 100% of the pumped compressed liquefied fluid is re-condensed, the pressure of the intermediate-pressure re-condensed stream is approximately 520 psia for LNG and 455 psia for LA, thus providing a large expansion in the power-producing turbine.

The phase-change heat in the gasifying side of the gasifying/condensing heat exchanger (i.e., the heat absorbed by the cold pumped fluid when changing from a compressed liquid to a supercritical fluid) is provided by the expanded gasified fluid as it is re-condensed to form the intermediate-pressure liquid.

The intermediate-pressure fluid is pumped to a supercritical pressure, superheated, and then expanded through an expansion turbine or other power-producing expansion device to the final system pressure (pipeline or user pressure for LNG or near-atmospheric pressure for LA). The first expansion of the heated and gasified fluid down to the pressure of the re-condensed intermediate-pressure fluid is one new source of power.

It should be noted that a portion of the heat absorbed when (i) heating the cold intermediate-pressure fluid or (ii) heating the cold fluid exiting the gasifying side of the gasifying/condensing heat exchanger, can be supplied by the re-condensing of the working fluid of a Rankine power cycle or the rejected heat of a Brayton or other type heat-to-power cycle to increase the power output of the heat-to-power cycle. Some such heat-to-power cycles are described in U.S. Pat. No. 9,359,919, the teachings of which are incorporated herein by reference in their entirety. The heat source for the heat-to-power cycle can be from a source independent of the heat source for the main power cycle or from the same heat source.

Certain embodiments of the disclosure involve pumping and heating a low-pressure incoming fluid to make a superheated supercritical fluid, expanding this fluid to generate power, re-condensing the expanded fluid against itself to produce an intermediate-pressure liquefied fluid, and re-pumping, re-heating, and re-expanding this intermediate-pressure fluid to make additional power. Certain embodiments involve the addition of a Rankine, Brayton, or other heat-to-power cycle by utilizing the rejected heat of the heat-to-power cycle to provide a portion of the heat transferred to the intermediate-pressure fluid after the re-pumping step.

The method described in the preceding paragraph, of re-condensing a stream against itself such that a second pumping, heating, and expansion can be accomplished, is not limited to the case where the initial low-pressure cold liquid is re-condensed against itself, nor limited to the case where 100% of the phase-changed fluid is re-condensed against itself. For example, an initial stream of LA at low pressure could be pumped, heated, and expanded to produce power, but with the phase-change heat provided by another fluid, being condensed by the cold absorbed from the liquid air as the liquid air is heated, to form a condensate which is then pumped to a high-pressure compressed liquid stream, converted to a superheated supercritical fluid in a condensing vaporizing heat exchanger, supplied additional superheat and expanded to produce power and an expanded subcritical superheated stream with all or a portion of the expanded stream being re-condensed against the high-pressure compressed liquid stream, in a closed or partially opened loop. The portion being re-condensed would supply all of the phase-change heat required to change the compressed other fluid to a supercritical fluid.

District energy systems are becoming more and more common in the U.S. Such energy systems may supply one or more of heating, power, and chilled water, for example, for air conditioning. The techniques of the present disclosure, in either an LA or LNG configuration, could be integrated with such a district energy system.

The concepts of this disclosure are not limited to natural gas and air, but can be applied to other suitable fluids as well.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
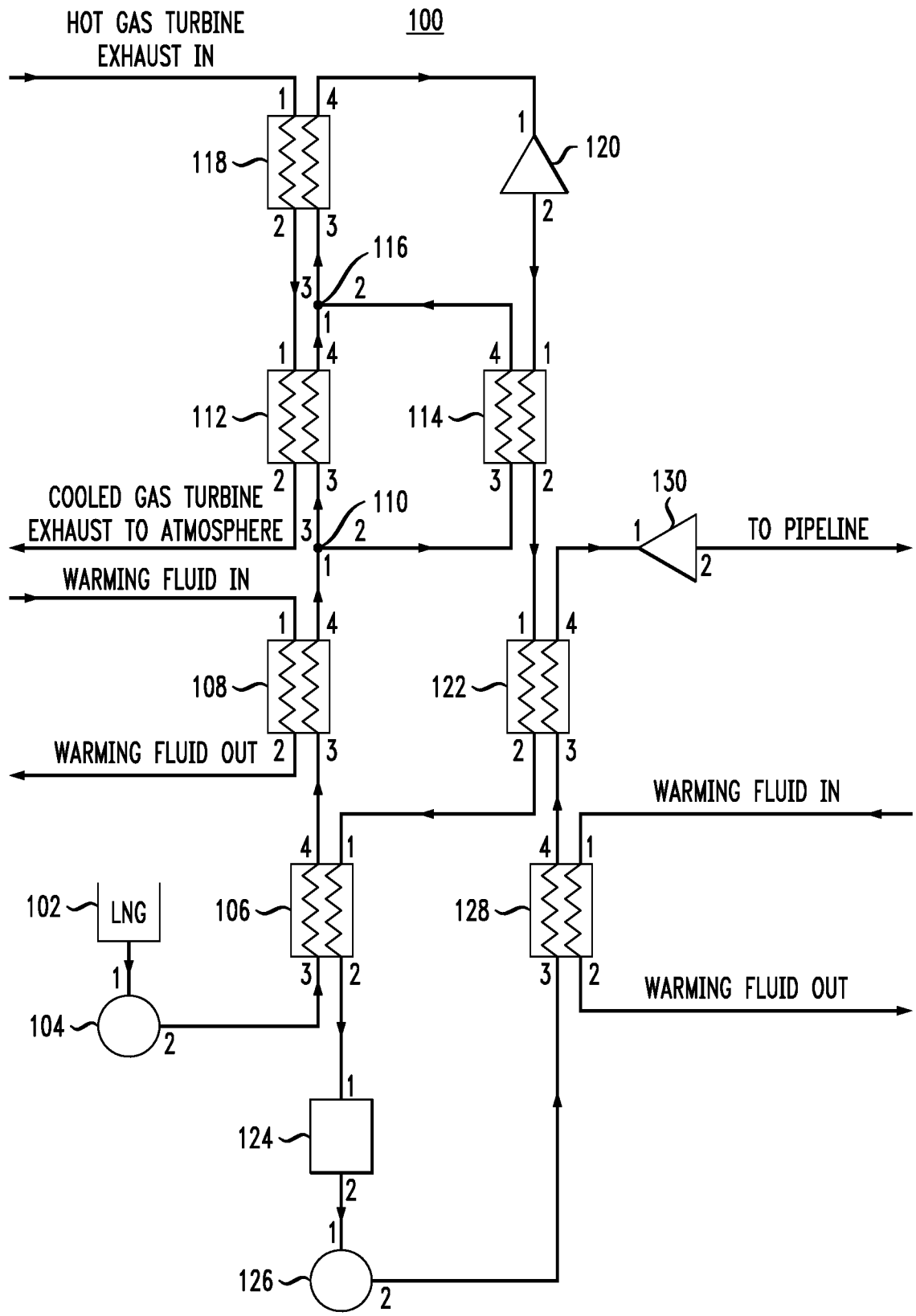
FIG. 1 is a diagram representing a power cycle according to one possible embodiment of the disclosure.

FIG. 1 is a diagram representing a power cycle 100 according to one possible embodiment of the disclosure. The power cycle 100 can be applied to an LNG regasification system in order to produce efficient power while re-gasifying the LNG and reducing the amount of sea water or ambient air cooling required to gasify the LNG. As described in further detail below, the power cycle 100 includes the following sequence of devices and process steps: 102, 104, 106, 108, 110, 112/114, 116, 118, 120, 114, 122, 106, 124, 126, 128, 122, and 130.

The LNG is supplied to the system from a low-pressure reservoir 102, usually at or near atmospheric pressure but for some regasification applications, particularly for peak-shaving LNG plants, could be at a higher pressure if the lower cost of producing the LNG at a higher reservoir pressure justifies the resulting reduced expansion power and higher-cost storage reservoir.

Pump 104 takes suction from the reservoir 102 at pump connection 1 and pumps the LNG, converting the LNG to a high-pressure compressed liquid, usually in the range of 1000 to 2500 psia, discharging from pump connection 2, and directing the high-pressure compressed liquid to connection 3 of gasifying/condensing heat exchanger 106, where the compressed liquid LNG, by means of heat exchange, is converted to a gasified superheated supercritical fluid and directed from connection 4 of heat exchanger 106 to connection 3 of warming heat exchanger 108.

Additional super heat is added to the gasified superheated supercritical fluid as the fluid transits heat exchanger 108 from connection 3 to connection 4 with heat transferred from the warming fluid entering at connection 1 and discharging from connection 2 of heat exchanger 108. The warming fluid in heat exchanger 108, transiting from connection 1 to connection 2, is usually ambient air; warming water, such as water from an ocean, river, lake, cooling tower, etc.; or a working fluid from a Rankine or other heat-to-power cycle, in which case, the cold in the gasified superheated supercritical fluid is used to cool or cool and re-condense the working fluid as it heats the superheated supercritical fluid. Typically, the superheated supercritical fluid exits heat exchanger 108 at connection 4 at about 50° F. to 100° F. and is directed to a flow splitter 110.

A portion of the flow entering the flow splitter 110 is directed to connection 3 of a low-temperature gas-turbine-exhaust heat exchanger 112, and the remaining portion is directed to connection 3 of a high-temperature recuperator heat exchanger 114. The portion entering heat exchanger 112 at connection 3 is further superheated by a low-temperature gas-turbine-exhaust stream flowing from connection 1 to connection 2 of heat exchanger 112, exits heat exchanger 112 at connection 4, and enters a flow mixer 116 at connection 1.

The portion from connection 2 of flow splitter 110 traverses from connection 3 to connection 4 of heat exchanger 114 and is applied at connection 2 of flow mixer 116.

Flow mixer 116 mixes the portion of the split stream from connection 4 of heat exchanger 112 with the portion of the split stream diverted to recuperator heat exchanger 114. The combined fluid stream exits flow mixer 116 at connection 3, is directed to connection 3 of a high-temperature gas turbine heat exchanger 118, where the fluid stream is provided additional superheat by heat transfer from the high-temperature gas turbine exhaust entering connection 1 of heat exchanger 118, and exits heat exchanger 118 at connection 4. The heat in the high-temperature gas turbine heat exchanger 118 is provided by the high-temperature gas turbine exhaust, which enters heat exchanger 118 at connection 1, is cooled by heat transfer to the fluid stream being superheated, and exits heat exchanger 118 at connection 2 as the low-temperature gas turbine exhaust stream directed to connection 1 of the low-temperature gas turbine exhaust heat exchanger 112. The low-temperature gas turbine exhaust stream exits the system to atmosphere at connection 2 of heat exchanger 112.

The superheated fluid stream exiting heat exchanger 118 at connection 4 is directed to inlet connection 1 of expansion turbine 120 and produces power and an expanded sub-critical pressure superheated stream as it travels through the expansion turbine 120 to exit at connection 2, where the stream is directed to connection 1 of the above-mentioned recuperator heat exchanger 114. Typically, the expansion turbine 120 would drive an electric generator to produce electric power.

The expanded sub-critical pressure superheated stream exits heat exchanger 114 at connection 2 still as a superheated sub-critical fluid but at a lower temperature than when entering at connection 1 due to the transfer of heat to the above-mentioned stream traveling from connection 3 to connection 4 of heat exchanger 114, which is further superheated by the expanded stream from connection 2 of expansion turbine 120 flowing from connection 1 to connection 2 of heat exchanger 114. In a preferred operating mode, the temperature of the fluid entering flow mixer 116 at connection 2 from connection 4 of heat exchanger 114 is equal to the temperature of the fluid entering the flow mixer 116 at connection 1 from connection 4 of heat exchanger 112.

The fluid from connection 2 of heat exchanger 114 (i) enters a low-temperature recuperator heat exchanger 122 at connection 1, (ii) is cooled by heat transfer from the supercritical superheated fluid transiting heat exchanger 122 from connection 3 to connection 4, and (iii) exits at connection 2 of heat exchanger 122 still as a superheated sub-critical fluid but at a lower temperature than when entering at connection 1.

The fluid from connection 2 of heat exchanger 122 enters at connection 1 of the gasifying/condensing heat exchanger 106, where the superheated sub-critical fluid is re-condensed to an intermediate-pressure LNG, the pressure (usually about 520 psia) being set by the saturation pressure of the fluid at the temperature the fluid is cooled to in heat exchanger 106 by exchanging heat with the high-pressure compressed liquid mentioned above traveling through heat exchanger 106 from connection 3 to connection 4. The intermediate-pressure re-condensed LNG is directed from connection 2 of heat exchanger 106 to connection 1 of accumulator 124.

The intermediate-pressure LNG exits the accumulator 124 at connection 2, is directed to the suction connection 1 of pump 126, and exits the pump 126 at discharge connection 2 as a supercritical compressed fluid at a pressure higher than the pressure of the receiving NG pipeline or NG-user-system pressure (usually at a pressure 500 to 1500 psi higher than the pressure of the receiving NG pipeline or NG-user-system pressure).

The supercritical compressed fluid exiting pump 126 at connection 2 is directed to warming heat exchanger 128 at connection 3 and, by means of heat exchange, the fluid gains superheat, exiting heat exchanger 128 at connection 4. The warming fluid in heat exchanger 128, transiting from connection 1 to connection 2, is usually ambient air; warming water such as water from an ocean, river, lake, cooling tower, etc.; or a working fluid from a Rankine or other heat-to-power cycle in which case the cold in the supercritical fluid is used to cool or cool and re-condense the working fluid as it heats the supercritical NG fluid.

The superheated supercritical fluid exiting at connection 4 of heat exchanger 128 is directed to connection 3 of low-temperature recuperator heat exchanger 122 in which additional super heat is added to the superheated supercritical fluid by an exchange of heat with the above-mentioned stream transiting heat exchanger 122 from connection 1 to connection 2 and exits connection 4 of 122 as an additionally superheated supercritical fluid.

The additionally superheated supercritical fluid exiting connection 4 of heat exchanger 122 is directed to the inlet connection 1 of expansion turbine 130, which produces power and an expanded supercritical or sub-critical pressure superheated NG stream at or near the pressure of the receiving pipeline or gas-using system, as the fluid travels through the expansion turbine 130 to exit at connection 2 where the stream is directed either to the natural gas pipeline or to the inlet connection of a gas-using system.

While FIG. 1 indicates gas turbine exhaust (GT EXH) as the heating fluid entering exchanger 118 at connection 1, other suitable high-temperature fluids in the approximate range of 400° F. to 2000° F. can be utilized. For temperatures under about 930° F., there is little benefit of splitting the stream exiting heat exchanger 108. Instead, all of the flow may be directed to exchanger 114, and exchanger 112 may be eliminated.

If heat exchanger 128 is used as a heat sink for the working fluid from an ORC or other heat cycle, then the temperature of the supercritical superheated fluid exiting connection 4 of heat exchanger 128 may be low enough to be used, in an additional heat exchanger, either directly or through an intermediate heat-transfer fluid, such as methanol, for gas turbine inlet air cooling or for other cooling purposes, including being used as a heat sink for an additional heat-to-power cycle.

If an ORC or other heat cycle is integrated into the system of FIG. 1, then the heat supply to the ORC or other heat cycle could be supplied by a gas turbine or gas engine, or the exhaust flow from the gas turbine or gas engine supplying the heat to heat exchanger 118 could be split between the ORC cycle and heat exchanger 118.

One familiar with the art of heat-to-power cycles will recognize that there are places in the power cycle 100 of FIG. 1 where additional heat sources could be used to increase the power output of the cycle. For example, heat could be added between connection 4 of exchanger 122 and connection 1 of expansion turbine 130 and/or between connection 2 of splitter 110 and connection 3 of exchanger 114, and/or between connection 4 of heat exchanger 108 and connection 1 of splitter 110. For example, this heat could be supplied from the exhaust of simple-cycle gas turbines driving the LNG process at export terminal. Alternatively, if the exhaust of an intercooled gas turbine is used as the heat source for heat exchanger 118, then the intercooler heat could be a second heat source, or a gas engine could be the primary heat source for exchanger 118 with a jacket water and turbocharger aftercooler heat as secondary heat sources. Alternatively, the secondary heat source could be from a hot heat-transfer fluid heated electrically at off-peak times using resistance heating to heat the heat-transfer fluid.

For applications with high gas pipeline pressure (higher than approximately 850 psia) and/or high temperature entering connection 1 of heat exchanger 118 (approximately above 950° F.), it may be beneficial to add a recuperator heat exchanger after connection 2 of expansion turbine 130 and move the recovered heat to another part of the cycle as described above.

For LNG applications with unusually low pipeline pressure, it may be beneficial to make the expansion in expansion turbine 130 a two-stage process with reheating between the two stages.

A duct burner could be added between the exhaust connection of the gas turbine and connection 1 of heat exchanger 118.

The power cycle 100 of FIG. 1 could be used with liquid air as the low-pressure liquid in reservoir 102, with expansion turbine 130 exhausting to atmosphere. In this case, expansion turbine 130 could be replaced with two expansion turbines in series with re-heating between the exit of the first turbine and the inlet of the second turbine.

In addition to efficiently making power when re-gasifying LNG at an import terminal, there are other places where the LNG power system of FIG. 1 could be used. One is at LNG export terminals, where some of the LNG produced could be used for producing peak-time electricity if the rates were such that it makes economic sense to use some of the LNG for power production rather than exporting it. Another is for locations where there is both a shortage of peak-time electricity and a shortage of gas, where, for example, due to restrictions on pipeline construction, such locations are very close to not having enough pipeline capacity at peak-demand times. In this case, the LNG power system of FIG. 1 could be both an electric power and gas storage system returning both gas to the pipeline system and electricity to the grid. There are over 50 existing peak-shaving LNG plants in the U.S., many of which operate only a few hundred hours per year. With the addition of the LNG power system of FIG. 1, these facilities could be producing revenue 1000 hours per year or more.

Figure 2:
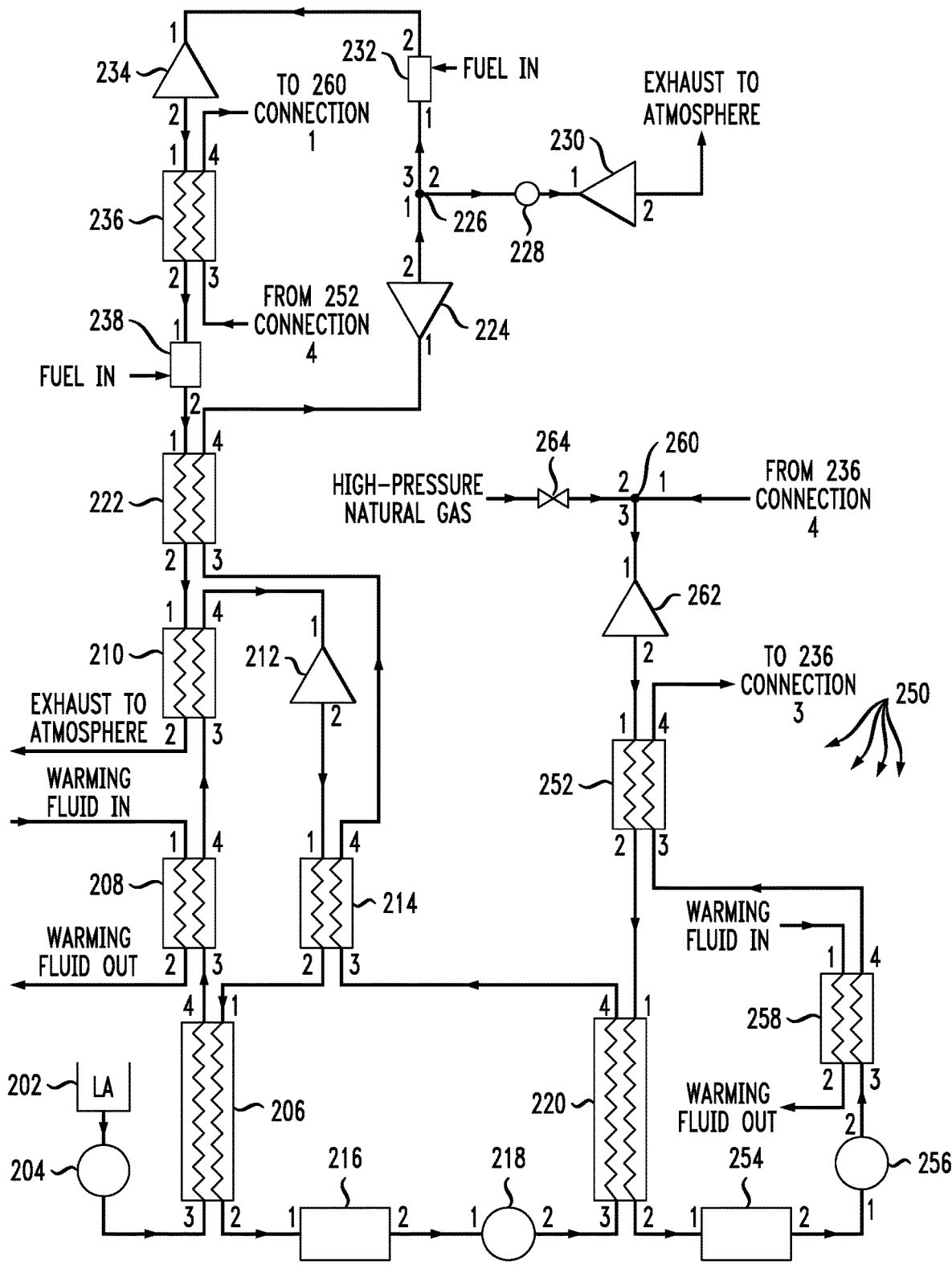
FIG. 2 is a diagram representing a power cycle according to another possible embodiment of the disclosure.

FIG. 2 is a diagram representing a power cycle 200 according to another possible embodiment of the disclosure. The power cycle 200 can be applied to a liquefied air power generation system. The LA is supplied to the system from low-pressure reservoir 202, usually at or near atmospheric pressure but could be at a higher pressure if the lower cost of producing the LA at a higher reservoir pressure justifies the resulting reduced expansion power.

As described in further detail below, the power cycle 200 includes the following sequence of devices and process steps: 202, 204, 206, 208, 210, 212, 214, 206, 216, 218, 220, 214, 222, 224, 226, and both (i) 228, 230 and (ii) 232, 234, 236, 238, 222, 210.

Pump 204 connection 1 takes suction from reservoir 202 and pumps the LA converting the LA to a high-pressure compressed liquid, usually in the range of 1000 to 2500 Asia, discharging from pump connection 2 where it is directed to connection 3 of gasifying/condensing heat exchanger 206, which converts the compressed LA, by means of heat exchange, to a gasified superheated supercritical fluid air stream exiting from connection 4 of gasifying/condensing heat exchanger 206 and directed to connection 3 of warming heat exchanger 208.

Additional super heat is added to the gasified superheated supercritical air as the stream transits heat exchanger 208 from connection 3 to connection 4 as heat is transferred from the warming fluid entering at connection 1 and discharging from connection 2 of heat exchanger 208. The warming fluid in heat exchanger 208, transiting from connection 1 to connection 2, is usually ambient air; warming water such as water from an ocean, river, lake, cooling tower, etc.; or a working fluid from a Rankine or other heat-to-power cycle, in which case the cold in the gasified superheated supercritical fluid is used to cool or cool and condense the working fluid as the working fluid heats the superheated supercritical air. Typically, the superheated supercritical air exits heat exchanger 208 at connection 4 at about 50° F. to 100° F.

The superheated supercritical air after exiting heat exchanger 208 at connection 4 is directed to connection 3 of low-temperature duct burner heat exchanger 210 and, by means of heat transfer from the low-temperature duct burner combustion products stream transiting heat exchanger 210 from connection 1 to connection 2, is supplied additional heat and exits at connection 4 of heat exchanger 210 as superheated supercritical air at a temperature higher than when entering at connection 3. The low-temperature duct burner combustion products stream, after transferring heat to the superheated supercritical air stream, exits the system at connection 2 of heat exchanger 210 at atmospheric pressure.

The superheated supercritical air stream exiting exchanger 210 at connection 4 is directed to inlet connection 1 of expansion turbine 212, producing power and an expanded sub-critical pressure superheated air stream as the stream travels through the expansion turbine 212 to exit at connection 2, where the expanded sub-critical pressure superheated air stream is directed to connection 1 of recuperator heat exchanger 214. Typically, the expansion turbine 212 would drive an electric generator to produce electric power.

The expanded sub-critical pressure superheated air stream exits heat exchanger 214 at connection 2 still as superheated sub-critical pressure air but at a lower temperature than when entering at connection 1 due to a transfer of heat to the fluid stream transiting heat exchanger 214 from connection 3 to connection 4.

The superheated sub-critical pressure fluid air stream exiting heat exchanger 214 at connection 2 is directed to connection 1 of gasifying/condensing heat exchanger 206, where the superheated sub-critical pressure air is re-condensed to an intermediate-pressure liquid air stream, the pressure (usually about 460 psia) being set by the saturation pressure of the air at the temperature the air is cooled to in heat exchanger 206 by exchanging heat with the high-pressure compressed liquid air mentioned above traveling through heat exchanger 206 from connection 3 to connection 4, the heat exchange converting the high-pressure compressed liquid air stream to the above-mentioned gasified superheated supercritical fluid air stream.

The intermediate-pressure re-condensed liquid air is directed from connection 2 of gasifying/condensing heat exchanger 206 to connection 1 of accumulator 216. The intermediate-pressure liquid air exits the accumulator 216 at connection 2, is directed to pump 218 suction connection 1, and exits the pump 218 at discharge connection 2 as a supercritical fluid, which is directed to connection 3 of gasifying/condensing heat exchanger 220.

By means of heat transfer from a superheated subcritical pressure mostly methane (e.g., more than 85 mole percent) stream exiting at connection 2 of recuperator heat exchanger 252 of a mostly methane Rankine power-cycle loop 250 and transiting from connection 1 to connection 2 of the gasifying/condensing heat exchanger 220, the supercritical fluid from pump 218 is converted to a superheated supercritical fluid air stream and directed from connection 4 of condensing/vaporizing heat exchanger 220 to connection 3 of the above-mentioned recuperator heat exchanger 214. The Rankine loop 250 includes the following sequence of devices and process steps: 254, 256, 258, 252, 236, 260, 262, 252, 220 and back to 254.

By means of heat transfer from the expanded sub-critical pressure superheated stream transiting exchanger 214 from connection 1 to connection 2, the superheated supercritical fluid air stream from heat exchanger 220 is further superheated, exiting exchanger 214 as a superheated supercritical air stream at connection 4 and directed to connection 3 of high-temperature duct burner heat exchanger 222.

By heat transfer from the high-temperature duct burner combustion products stream transiting from connection 1 to connection 2 of heat exchanger 222, the superheated supercritical air stream from heat exchanger 214 is further superheated, exiting exchanger 222 at connection 4, still as a superheated supercritical air stream, but at a higher temperature than when entering heat exchanger 222 at connection 3. The high-temperature duct burner combustion products stream exits heat exchanger 222 as the low-temperature duct burner combustion products stream at connection 2 and directed to connection 1 of the above-mentioned low-temperature duct burner heat exchanger 210.

The superheated supercritical air stream exiting connection 4 of the high-temperature duct burner heat exchanger 222 is directed to expansion turbine 224, producing power and an expanded superheated air stream as the stream transits from connection 1 to connection 2 of expansion turbine 224, exiting at connection 2 at a pressure typically in the range of 400 psia to 100 psia but could be higher, even above the supercritical pressure, and directed to connection 1 of flow splitter 226.

Flow splitter 226 divides the stream from expansion turbine 224 into two superheated air streams, with one of the split streams exiting at connection 2 of flow splitter 226 and directed, via valve 228, to the inlet connection 1 of expansion turbine 230 and the other split air stream exiting flow sputter 226 at connection 3 and directed to connection 1 of combustion turbine combustor 232.

In combustion turbine combustor 232, fuel is added to the expanded superheated stream and combusted, producing a hot stream of combustion gases (typically in the range of 1600° to 2400° F.), which exits connection 2 of combustion turbine combustor 232 and is directed to connection 1 of combustion turbine expansion turbine 234, wherein the hot stream of combustion gases is expanded to produce power and a reduced-temperature stream of combustion gases, typically in the temperature range of 700 F to 1100 F, and at a pressure slightly above atmospheric pressure, exiting combustion turbine 234 at connection 2 and directed to connection 1 of mostly methane heat exchanger 236.

In heat exchanger 236, by heat transfer, the reduced temperature stream of combustion gases from combustion turbine 234 is cooled as it transits from connection 1 to connection 2 of heat exchanger 236 and exits at connection 2 as a cooled combustion gas stream, while an additionally superheated supercritical mostly methane stream entering connection 3 of heat exchanger 236 is heated, by heat transfer from the reduced temperature stream of combustion gases, as it transits from connection 3 to connection 4, exiting heat exchanger 236 as a high-temperature superheated supercritical mostly methane stream.

The cooled combustion gas stream exits connection 2 of exchanger 236 and is directed to connection 1 of duct burner 238 where fuel is added and an additional combustion takes place, reheating the cooled combustion gas stream forming the high-temperature duct burner combustion products stream which exits the duct burner 238 at connection 2 and is directed to the connection 1 of above-mentioned high-temperature duct burner heat exchanger 222.

The superheated subcritical pressure mostly methane stream, mentioned above, transiting from connection 1 to connection 2 of the gasifying/condensing heat exchanger 220, is cooled by heat transfer from the above-mentioned stream of supercritical air transiting from connection 3 to connection 4 of heat exchanger 220, exiting connection 2 of heat exchanger 220 as liquid mostly methane (LNG) at the saturation pressure associated with the exiting temperature as the mostly methane stream heats the supercritical air which, as mentioned above, exits heat exchanger 220 at connection 4 as a superheated supercritical air fluid stream. The liquid mostly methane (LNG) exiting at connection 2 of heat exchanger 220 is directed to connection 1 of LNG accumulator 254.

The LNG exits accumulator 254 at connection 2, is directed to connection 1 of pump 256, and leaves pump 256 at connection 2 as a supercritical mostly methane stream directed to connection 3 of gasifying heat exchanger 258.

By means of heat transfer from the warming fluid transiting heat exchanger 258 from connection 1 to connection 2, the supercritical mostly methane stream from pump 256 is superheated. The warming fluid in heat exchanger 258, transiting from connection 1 to connection 2, is usually ambient air; warming water such as water from an ocean, river, lake, cooling tower, etc.; or a working fluid from a Rankine or other heat-to-power cycle, in which case, the cold in the supercritical methane stream is used to cool or cool and re-condense the working fluid as it superheats the supercritical mostly methane stream.

The superheated supercritical mostly methane fluid exits connection 4 of heat exchanger 258 and is directed to connection 3 of recuperator heat exchanger 252, where, by means of heat transfer from the superheated subcritical mostly methane stream transiting from connection 1 to connection 2 of heat exchanger 252, the gasified superheated supercritical mostly methane stream is additionally superheated to form the above-mentioned additionally superheated supercritical mostly methane stream exiting heat exchanger 252 at connection 4 and directed to connection 3 of the above-mentioned heat exchanger 236.

The superheated supercritical mostly methane stream exits heat exchanger 236 at connection 4 as a high-temperature superheated supercritical mostly methane stream and is directed to connection 1 of mixer 260 and then from connection 3 of mixer 260 to connection 1 of expansion turbine 262, where the stream is expanded, producing power and a superheated subcritical mostly methane stream exiting at connection 2, directed to connection 1 of above-mentioned recuperator heat exchanger 252, supplying heat as the stream transits to exit connection 2 of heat exchanger 252, and then directed to connection 1 of condensing/vaporizing heat exchanger 220 mentioned above, completing the mostly methane Rankine power-cycle loop.

Note that the mostly methane fluid for filling and starting the Rankine power cycle is obtained from a high-pressure NG source (usually from a NG pipeline) and enters the Rankine power-cycle loop 250 through startup, filling, and shutdown de-pressurizing valve 264. Since it is necessary to treat the natural gas in a treating system (not shown) to remove $CO_2$ and other components that would freeze up or corrode the cryogenic exchanger prior to liquefaction, it may be economical to design accumulator 254 as a storage vessel so that, for the next pass through the Rankine power-cycle loop 250, it would not be necessary to admit fresh natural gas to the system except to account for any leakage. Alternatively, the accumulator/storage vessel 254 could be filled with LNG from another source and eliminate the connection to a high-pressure natural gas source and the need for a treating system.

The working fluid for the Rankine power-cycle 250 is not limited to methane.

The split stream exiting flow splitter 226 at connection 2 and directed via valve 228 to expansion turbine 230, is expanded in the expansion turbine 230, producing power and a low-temperature air stream exiting expansion turbine 230 at connection 2 at a low pressure, usually at atmospheric pressure, and at a temperature typically in the range of 100° F. to 300° F. depending on the turbine inlet pressure and temperature. Expansion turbine 230 is not always used, in which case, all of the flow from flow splitter 226 would be directed towards combustion turbine 234 with flow directed to expansion turbine 230 only when the economics of operation dictate since the system fuel rate and mass flow of liquid air per unit of power generated increases as flow to expansion turbine 230 increases.

It should be noted that, in the embodiment of FIG. 2, the combustion turbine 234 does not include an air compressor. However, a conventional gas turbine could be used, in which case, the air flow from the gas turbine compressor would be shown schematically between splitter 226 connection 3 and combustor 232 connection 1. Using a conventional gas turbine would mean that the majority of the air stream entering splitter 226 at connection 1 would flow out connection 2 to expander turbine 230, with the flow to the conventional gas turbine being set by the gas turbine manufactures' limit of accepting hot compressed air into the combustor 232.

It should also be noted that, for the FIG. 2 arrangement with a gas turbine without a compressor section, the flow split to expansion turbine 230 could alternatively be between connection 4 of exchanger 222 and connection 1 of expansion turbine 224.

Those familiar with the art will recognize that the cold in the compressed fluid streams exiting from connection 2 of pump 256 and/or from connection 4 of heat exchanger 206 can be used to absorb, in one or two heat exchangers, the rejected heat from the working fluid of one or more Rankine or other type heat-to-power cycles, rather than rejecting all of this cold to heat exchangers 208 and 258. All or a portion of this cold could also be used for gas turbine inlet air cooling. Alternatively, if the cold is used for absorbing the rejected heat from a heat-to-power cycle, then there may still be enough cold left after this use to provide gas turbine inlet air cooling.

It should also be noted that the embodiment of FIG. 2 is one of many ways of producing power from the high-pressure supercritical air stream exiting connection 4 of heat exchanger 220. For example, any of the known methods of extracting power from compressed air in a compressed air energy system (CAES) can be applied to extracting power from this stream. In addition, there are many known methods, beyond the method of the embodiment of PG. 2, that could be used to heat, expand to produce power, and recover heat from this expansion, of the supercritical stream exiting connection 4 of heat exchanger 206. By the same token, the embodiment of FIG. 1 discloses one of many ways of heating and producing power from the two high-pressure compressed liquid streams shown in FIG. 1.

Figure 3:
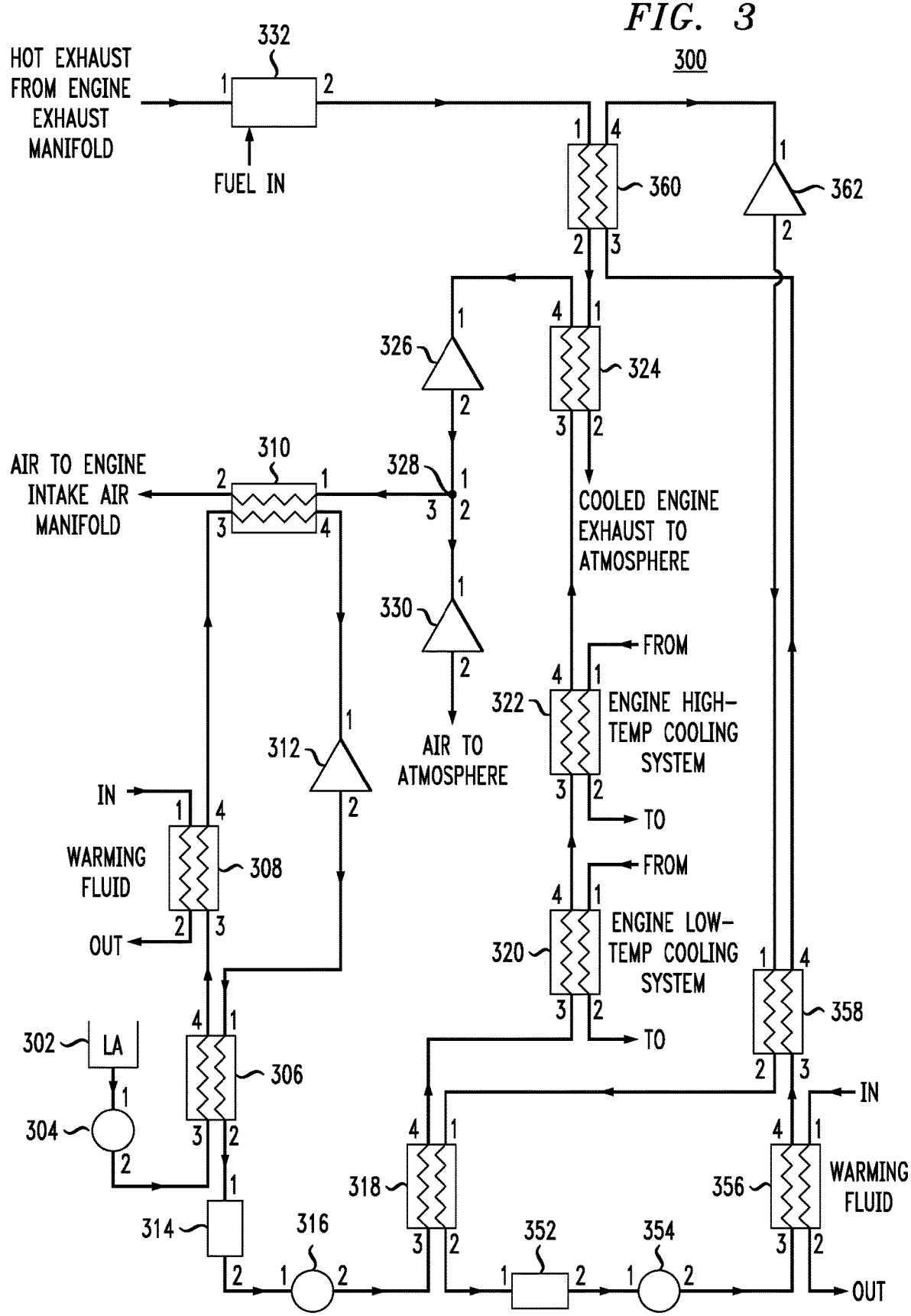
FIG. 3 is a diagram representing a power cycle according to yet another possible embodiment of the disclosure.

FIG. 3 is a diagram representing a power cycle 300 according to yet another possible embodiment of the disclosure. The power cycle 300 is applied in a liquefied air power generation system using a reciprocating diesel, gas, or dual-fuel engine as the primary heat source for the cycle. In particular, a turbocharged engine (not shown) could be used in which the turbocharger is not utilized, but instead the hot exhaust from the engine exhaust manifold is directed to the power cycle 300, and pressurized air is returned to the engine air intake manifold from the power cycle 300 at the same pressure and temperature as the engine would have received from its turbocharger after cooling in the turbocharger after-cooler. In some implementations, both the exhaust and the air sides of the turbocharger and the turbocharger aftercooler are bypassed using a system of by-pass valves, while, in other implementations, the turbocharger and aftercooler are removed from the engine. Eliminating the turbocharger and aftercooler from the engine can provide one or more of the following advantages:

Saves the cost of the turbocharger and after-cooler;
  Provides the power cycle 300 with exhaust gas 250° F. to 350° F. higher than if from the exhaust side of the turbocharger. This higher temperature increases the output and efficiency of the power cycle 300; and
  Achieves a small gain in power from the engine by reducing the exhaust backpressure on the engine. Note that some backpressure is maintained on the engine to keep the velocity of the gases exiting the engine exhaust valves from exceeding supersonic speed.

However, removing them from the engine limits the use of the engine to use with this power cycle.

The embodiment of FIG. 3 includes an ORC cycle 350 using a portion of the residual cold from the LA power cycle 300 to generate additional power. As described in further detail below, the LA power cycle 300 includes the following sequence of devices and process steps: 302, 304, 306, 308, 310, 312, 306, 314, 316, 318, 320, 322, 324, 326, 328, and 310/330. The ORC cycle 350 includes the following sequence of devices and process steps: 352, 354, 356, 358, 360, 362, 358, 318, and back to 352.

Liquid air is supplied to the power cycle 300 at low-pressure reservoir 302 usually at or near atmospheric pressure, where the LA is directed to pump 304 suction connection 1 and exits pump 304 at connection 2 as a compressed liquid, at a pressure usually in the range of 1000 to 2500 psia.

The compressed LA is directed to connection 3 of gasifying/condensing heat exchanger 306, where, by means of heat exchange between the superheated sub-critical pressure air flowing through the exchanger 306 from connection 1 to connection 2, the compressed LA is converted to a superheated supercritical fluid air stream exiting gasifying/condensing heat exchanger 306 at connection 4 and directed to connection 3 of warming heat exchanger 308.

By means of heat exchange with the warming fluid flowing from connection 1 to connection 2 of warming heat exchanger 308, the superheated supercritical fluid air stream gains additional superheat and exits warming heat exchanger 308 at connection 4. The warming fluid could be ambient air; water from an ocean, river, lake, cooling tower, return water from a district energy chilled water system, etc.; or the working fluid of a Rankine cycle condensing as it flows from connection 1 to connection 2. Alternatively, the cold warming fluid exiting at connection 2 could be used for cooling in an HVAC system or a refrigerated warehouse as examples.

The additionally superheated super critical air exiting at connection 4 of warming heat exchanger 308 is directed to connection 3 of recuperator heat exchanger 310, where, by means of heat exchange, additional superheat is added to the already superheated supercritical air, while the hotter fluid transiting the recuperator heat exchanger 310 from connection 1 to connection 2 is cooled.

The superheated supercritical air exiting recuperator heat exchanger 310 at connection 4 is then directed to inlet connection 1 of expansion turbine 312 where the stream is expanded, producing power and a superheated subcritical pressure air stream exiting at connection 2 and directed to connection 1 of gasifying/condensing heat exchanger 306.

By means of heat exchange between the compressed liquid air stream air being converted to a superheated supercritical fluid as it transits heat exchanger 306 from connection 3 to connection 4 (as described above), the superheated subcritical pressure air stream is cooled and re-condensed to form an intermediate-pressure compressed liquid air stream at approximately 455 psia pressure and a temperature of about −230° F. as it flows from connection 1 to connection 2, exiting at connection 2 of condensing/vaporizing heat exchanger 306 and directed to connection 1 of accumulator 314.

The intermediate-pressure compressed liquid air exits accumulator 314 at connection 2 and is directed to connection 1 of pump 316, where, by pumping action, the pressure of the intermediate-pressure compressed liquid air is increased, exiting the pump 316 at connection 2 as supercritical air at a pressure typically in the range of 1000 psia to 2500 psia, but not limited to this range, and directed to connection 3 of condensing heat exchanger 318.

In heat exchanger 318, heat exchange between the ORC working fluid (preferably methane) transiting from connection 1 to connection 2 and the supercritical air flowing from connection 3 to connection 4 of heat exchanger 318, cools and condensing the working fluid while heating the intermediate-pressure supercritical air to produce a supercritical superheated air stream directed to connection 3 of low-temperature engine cooling system heat exchanger 320, where, by means of heat exchange between a low-temperature engine cooling system fluid (used to cool the turbocharged engine described previously) and the supercritical superheated air stream, the temperature of the supercritical superheated air stream is increased, while the temperature of the low-temperature engine cooling fluid is decreased.

The decreased-temperature low-temperature engine cooling fluid exits heat exchanger 320 at connection 2 and is directed back to the engine, while the increased-temperature superheated supercritical air stream exits heat exchanger 320 at connection 4 and is directed to connection 3 of the high-temperature engine cooling system heat exchanger 322, where additional superheat is added to the superheated supercritical air stream in the same manner as in heat exchanger 320.

The superheated supercritical air stream exits heat exchanger 322 at connection 4, at a temperature within about a 20° F. approach to the temperature of the incoming high-temperature engine cooling system fluid (used to cool the turbocharged engine described previously) entering heat exchanger 322 at connection 1, and is directed to connection 3 of the lower-temperature exhaust heat exchanger 324, where, by means of heat exchange from the lower-temperature exhaust stream flowing from connection 1 to connection 2, the superheated supercritical air stream is superheated again to its final temperature, while the lower-temperature exhaust stream is cooled to its final temperature and exits heat exchanger 324 (and the system) at connection 2.

The superheated supercritical air stream, at its final superheated temperature, exits heat exchanger 324 at connection 4 and is directed to connection 1 of expansion turbine 326, where the stream is expanded, producing power and a superheated subcritical pressure air stream exiting expansion turbine 326 at connection 2 at a pressure slightly above the required air pressure of the engine and directed to connection 1 of flow splitter 328.

A portion of the superheated subcritical pressure air stream equal to the amount of air required by the engine exits connection 3 of flow splitter 328 and is directed to connection 1 of recuperator heat exchanger 310 where, by heat exchange with the fluid transiting heat exchanger 310 from connection 3 to connection 4 (as described above), this portion of the superheated subcritical pressure air stream is cooled to the temperature required by the turbocharged engine and exits heat exchanger 310 at connection 2 and directed to the turbocharged engine air intake manifold.

The remaining portion of the air entering flow splitter 328 exits flow splitter 328 at connection 2 and is directed to connection 1 of expansion turbine 330, wherein the stream is expanded, producing power and a superheated subcritical pressure air stream exiting expansion turbine 330, and the system, at connection 2 at atmospheric pressure at a lower temperature than when entering the expansion turbine 330.

The exhaust stream from the exhaust manifold of the turbocharged engine (without using its turbocharger) enters the system at connection 1 of duct burner 332 where fuel is added and combustion takes place, increasing the temperature of the exhaust stream entering duct burner 332 at connection 1. The exhaust stream exits duct burner 332 at connection 2 as a high-temperature exhaust stream (typically, but not limited to, between 1100° F. and 1800° F.), and with slightly more mass and different chemical composition due to the combustion process than when entering the duct burner 332.

The high-temperature exhaust stream is directed to connection 1 of higher-temperature exhaust heat exchanger 360 where, by heat exchange with a superheated supercritical ORC working fluid stream (preferably methane) transiting the exchanger from connection 3 to connection 4, the hot exhaust stream is cooled and the ORC methane stream is heated, with the methane stream heated to approximately between 600° F. and 1000° F. and exiting heat exchanger 360 at connection 4. The hot exhaust stream from duct burner 332 is cooled within heat exchanger 360 to a temperature in the range of approximately 800° F. to 1100° F., exits heat exchanger 360 at connection 2, and is directed to connection 1 of lower-temperature exhaust heat exchanger 324.

The superheated supercritical air stream (from connection 4 of heat exchanger 322) flowing through heat exchanger 324 from connection 3 to connection 4 is heated by the engine exhaust stream flowing through heat exchanger 324 from connection 1 to connection 2, from which the cooled engine exhaust is released to the atmosphere. Thus, in the power cycle 300 of FIG. 3, the hot exhaust air direct from the exhaust manifold of the turbocharged engine (without passing through the turbocharger) is used to heat both the fluid of the ORC cycle 350 in heat exchanger 360 and the superheated supercritical air stream of the power cycle 300 in heat exchanger 324 before the cooled engine exhaust is vented to the atmosphere, while a portion of the re-expanded air of the power cycle 300 is returned to the turbocharged engine direct to the air intake manifold at the appropriate mass flow, temperature, and pressure via heat exchanger 310.

The heated methane exiting from connection 4 of higher-temperature exhaust heat exchanger 360 is directed to the inlet connection 1 of ORC expansion turbine 362, where the methane stream is expanded, producing power and a superheated subcritical pressure methane stream exiting the ORC expansion turbine 362 at connection 2 and directed to connection 1 of ORC recuperator heat exchanger 358, wherein, by heat transfer, the superheated subcritical pressure methane stream loses some of its superheat while increasing the superheat of an additionally superheated supercritical methane stream transiting from connection 3 to connection 4 of the ORC recuperator heat exchanger 358, exiting at connection 4, and directed to connection 3 of the above-mentioned higher-temperature exhaust heat exchanger 360.

The superheated subcritical pressure methane stream exits ORC recuperator heat exchanger 358 at connection 2 remaining as a superheated subcritical-pressure methane stream but at a lower temperature than when entering heat exchanger 358 and is directed to connection 1 of above-mentioned condensing heat exchanger 318.

By means of heat transfer from the supercritical air transiting the exchanger 318 from connection 3 to connection 4 (as described above), the superheated subcritical-pressure methane stream is re-condensed to liquid methane, exits condensing/vaporizing heat exchanger 318 at connection 2 at a temperature and pressure of approximately −130° F. and 530 psia, and is directed to connection 1 of liquid methane accumulator 352. The liquid methane exits the accumulator 352 at connection 2 and is directed to connection 1 of pump 354, wherein the liquid methane is pumped to a supercritical pressure, typically in the range of 1000 psia to 2500 psia, exiting pump 354 at connection 2 as slightly superheated supercritical methane and directed to connection 3 of warming heat exchanger 356, where, by means of heat exchange with the warming fluid flowing from connection 1 to connection 2 of warming heat exchanger 356, heat is added to the stream of the superheated supercritical methane flowing from connection 3 to connection 4, exiting at connection 4 at a higher superheat than when entering at connection 3 as an additionally superheated supercritical methane stream. The warming fluid could be ambient air; water from a river, lake, cooling tower, return water from a district energy chilled water system, etc.; or the working fluid of a Rankine cycle re-condensing as it traverses from connection 1 to connection 2. Alternatively, the cold warming fluid exiting at connection 2 could be used for cooling in an HVAC system or a refrigerated warehouse, as examples.

The additionally superheated supercritical methane stream exits connection 4 of warming heat exchanger 356 and is directed to connection 3 of ORC recuperator heat exchanger 358, thus completing the process loop of the ORC system 350.

Instead of using a turbocharged engine, the embodiment of FIG. 3 can be implemented with a modified gas turbine in which the compressor section has been removed, or with a fired turbine that includes a combustor and expansion turbine but no air compressor, with the air exiting connection 3 of flow splitter 328 and, being directed to the combustor of the modified gas turbine or the combustor of the fired turbine, with the exhaust from either of these machines being directed to connection 1 of duct burner 332. Heat exchanger 310 is removed and the stream from connection 4 of heat exchanger 308 would be directed to an additional lower-temperature exhaust gas heat exchanger using the exhaust stream exiting connection 2 of heat exchanger 324 to heat the stream exiting connection 4 of heat exchanger 308 prior to entering connection 1 of expansion turbine 312. Alternatively, an intercooled gas turbine, such as an LMS100 gas turbine of General Electric of Boston, Mass., with the first-stage air compressor removed, could be used instead of the reciprocating engine with its turbocharger removed or by-passed, and air at approximately the same pressure and temperature as would have been returned to the gas turbine second-stage air intake from the gas turbine's intercooler would be supplied from connection 2 of heat exchanger 310, thus increasing the output of the gas turbine, with the gas turbine exhaust being directed to connection 1 of duct burner 332. The power that would have been used to drive the first-stage compressor would be used to drive a generator. When used with a modified gas turbine, fired turbine, or intercooled gas turbine without its first-stage compressor, heat exchangers 320 and 322 could be deleted since engine-cooling fluid would not be available and a warming-fluid heat exchanger would be installed in their place.

A duct burner could be installed between connection 2 of the splitter 328 and connection 1 of expansion turbine 330 to increase the power in the expansion turbine 330. This would be of great value combined with the above modification, since the pressure into expansion turbine 330 would be much higher when combined with the gas turbine compared to the turbocharged engine. Alternatively, rather than a duct burner, a heat exchanger could be installed between splitter 328 and expansion turbine 330 with a hot molten salt fluid being used as the heat source with the molten salt heated at off-peak time with low-cost electric power and stored until needed at peak power-demand time. Alternatively, a series combination of hot molten salt handling the lower-temperature portion of the heating and the duct burner handling any increase in temperature above approximately 850° F. could be used.

The flow of air through the power cycle 300 of FIG. 3 is set by the speed of pump 218 and the temperature entering the lower-temperature exhaust heat exchanger 324. This temperature is controlled by controlling the temperature out of the duct burner 332 (by increasing or decreasing the fuel into the duct burner 332) or by by-passing some of the hot exhaust flow around the hot side of the high-temperature exhaust heat exchanger 360 or a combination of these control methods. By controlling the air flow through the system to equal the air flow required by the engine (or the gas turbine for the case of the above modification), there is no need for expansion turbine 330, or expansion turbine 330 could be connected or disconnected from the power cycle 300 as flow is adjusted to meet the desired power output.

From a mechanical standpoint, for a system utilizing both expansion turbines 326 and 330, a single generator could be installed between the two expansion turbines and driven by both of the turbines. For the case where expansion turbine 330 would sometimes run and at other times not be used, a disconnect/re-connect clutch would be installed in the shafting between expansion turbine 330 and the generator, such as an SSS gear type self-synchronizing over running clutch by SSS Clutch Company. New Castle, Del.

Note that, in the power cycle 300 of FIG. 3, some of the air that was originally the liquid air in reservoir 302 may be exhausted to the atmosphere at the output of expansion turbine 330, while the rest of that air is directed from connection 2 of heat exchanger 310 to the air intake manifold of the turbocharged engine. Furthermore, the resulting hot exhaust from the exhaust manifold of the turbocharged engine is applied at connection 1 of duct burner 332 and ultimately exhausted to the atmosphere at the output of heat exchanger 324 along with the combustion products from the fuel burned in the duct burner 332.

In the power cycle 300 of FIG. 3, some of the input heat to the cycle is directed to ORC cycle 350 via heat exchanger 360. However, this heat exchanger could be eliminated and ORC cycle 350 could have a heat source separate from power cycle 300 or use heat from power cycle 300 plus heat from one or more other sources.

Figure 4:
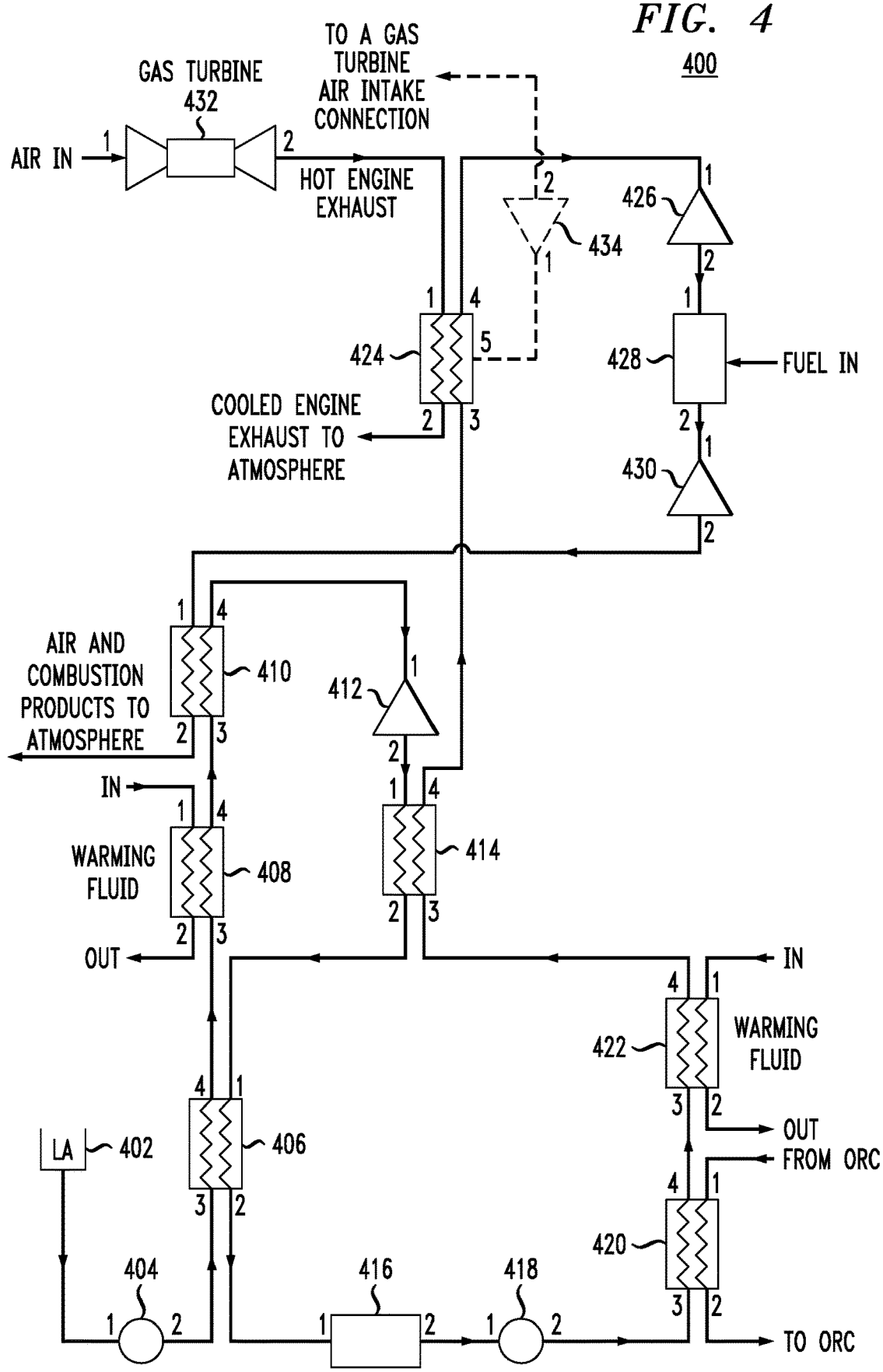
FIG. 4 is a diagram representing a power cycle according to yet another possible embodiment of the disclosure.

FIG. 4 is a diagram representing a power cycle 400, according to yet another possible embodiment of the disclosure. The power cycle 400 can be applied to a liquid air (LA) energy storage system in order to produce efficient power while re-gasifying the stored LA. Power cycle 400 includes the following sequence of devices and process steps: 402, 404, 406, 408, 410, 412, 414, 406, 416, 418, 420, 422, 414, 424, 426, 428, 430, and 410.

Liquid air in reservoir 402 is directed to pump 404, pumped to a supercritical pressure, then directed to gasifying/condensing heat exchanger 406, then directed to warming heat exchanger 408 as a superheated supercritical fluid, leaving heat exchanger 408 with additional superheat, then directed to and further heated in recuperator heat exchanger 410, then directed to expander turbine 412, producing power and a subcritical pressure superheated fluid, which is directed to recuperator heat exchanger 414, where the fluid is cooled, then directed back to heat exchanger 406, where the fluid is re-condensed, then directed to accumulator 416, then to pump 418 and pumped again to a supercritical pressure, then directed to heat exchanger 420 (which is a condenser for an organic Rankine cycle—not shown), where the fluid is heated as the organic Rankine cycle fluid is cooled and condensed.

The heated fluid leaves heat exchanger 420 as a superheated supercritical fluid and is directed to warming heat exchanger 422, which, like the previously described embodiments, could have a warming fluid from various sources. The fluid temperature is increased in heat exchange 422 and then directed to recuperator 414, where the fluid is again heated to a still higher temperature, then directed to gas turbine exhaust heat exchanger 424, where the fluid attains its highest temperature in the cycle, then directed to the high-pressure expansion turbine 426, where power is produced and the fluid temperature and pressure decreased as the fluid expands. The fluid then enters duct burner 428 where fuel is combusted in the air fluid stream, raising the temperature of the fluid to about 700° F. to 1100° F. The hot fluid (air with combustion products) is directed to the low-pressure expansion turbine 430, where additional power is produced, while the fluid temperature and pressure decrease, with the fluid exiting expansion turbine 430 at slightly above atmospheric pressure and directed to recuperator heat exchanger 410, where the fluid is cooled to its final system exit temperature of about 100° F. to 250° F.

This embodiment is well suited for high exhaust temperature, high-efficiency gas turbines such as the Model SGT-800 gas turbine by Siemens Energy of Germany, but the system is not limited to using a gas turbine 432 as the source of heat. When utilizing a high-temperature high-efficiency gas turbine as the heat source, the power system 400, including the ORC using a portion (about 25%-30%) of the exhaust stream, will produce about 1.5 times the power of the gas turbine generator 432. By controlling the division of the exhaust gas stream between the ORC and the liquid air cycle, the total power output, energy ratio (i.e., the amount of energy used to produce the LA divided by the total amount of energy produced) and the fuel rate can be adjusted to optimize the system economics.

Expansion turbine 434, with the dashed lines representing a connection from an intermediate-temperature point 5 between connections 3 and 4 of heat exchanger 424 and a connection to a gas turbine air intake connection, is an optional expansion turbine that would expand an extracted portion of the flow entering connection 3 of heat exchanger 424 and expand that extracted portion to near atmospheric pressure producing power and a cold air stream exiting connection 2 of optional expansion turbine 434. This cold stream could be at a temperature ranging from about −60° F. to about +40° F. depending on the location of the extraction point 5 between connection 3 and connection 4 of heat exchanger 424 and the pressure from the discharge of pump 418. This cold stream could be directed to the air intake of the gas turbine 432 providing the hot gas turbine exhaust to connection 1 of heat exchanger 424. This cold stream could provide all or a portion of the air required by gas turbine 432. Alternatively, the cold air stream could be directed to another gas turbine air intake. The purpose of supplying this cold air to a gas turbine air intake (whether the gas turbine 432 supplying the exhaust heat to heat exchanger 424 or to another gas turbine) is to increase the density and therefore the mass flow of the air entering the gas turbine, thus increasing its power and exhaust stream mass. This optional arrangement could be applied to any of the described LA power cycles.

Figure 4A:
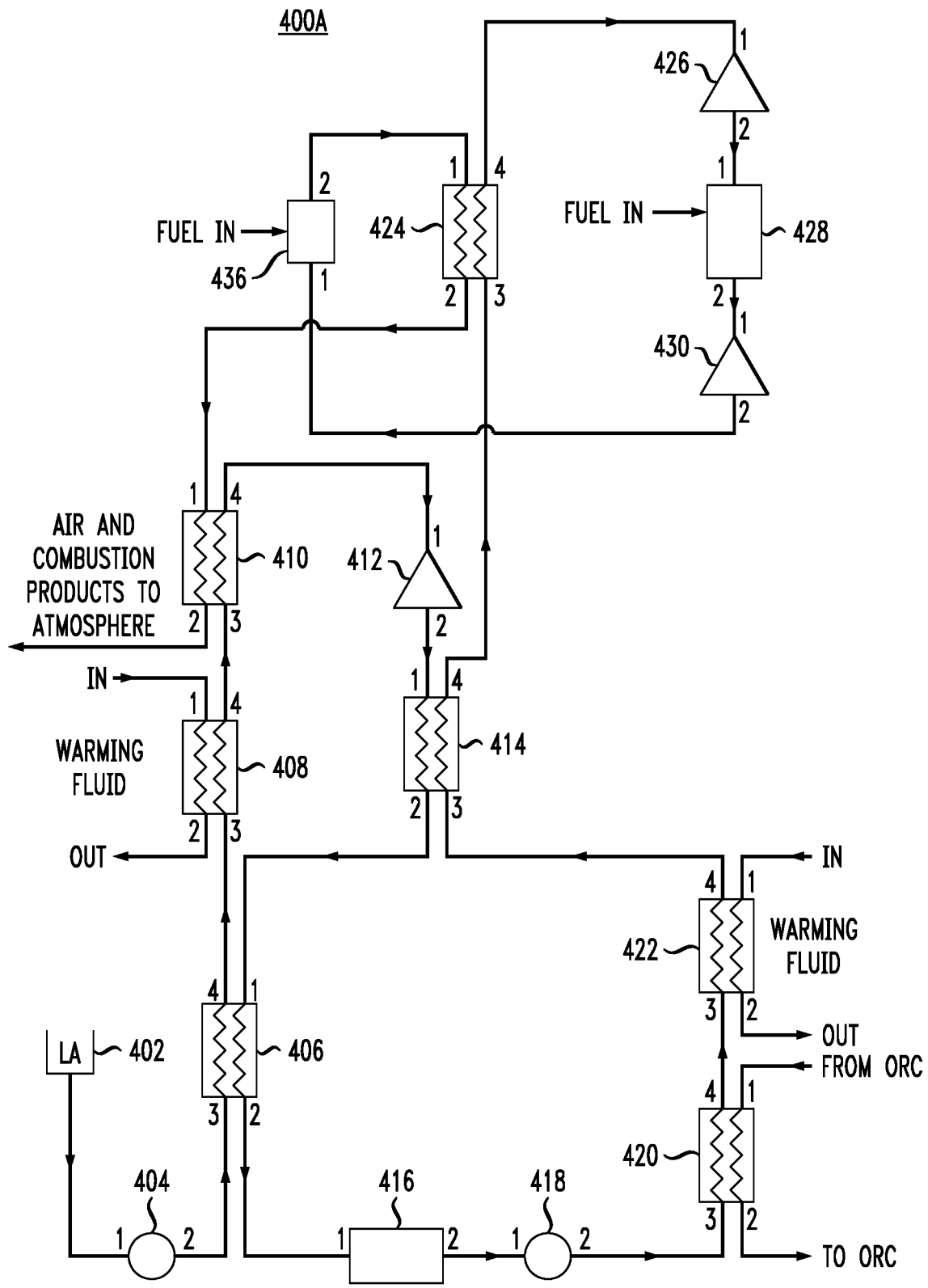
FIG. 4A is a diagram representing a power cycle according to yet another possible embodiment of the disclosure.

FIG. 4A is a diagram representing a power cycle 400A according to yet another possible embodiment of the disclosure. Power cycle 400A is a modification of power cycle 400 of FIG. 4, in which duct burner 428 now becomes the directly connected combustor 428 of a gas turbine from which the air compressor has been removed, and expansion turbine 430 is the expansion turbine from that gas turbine with its air compressor removed.

As can be seen from FIG. 4A, the exit stream from connection 2 of expansion turbine 430 is now directed to newly added duct burner 436, which, by the combustion of fuel, heats the stream which is then directed to connection 1 of gas turbine exhaust heat exchanger 424. The flow from connection 2 of gas turbine exhaust heat exchanger 424 is now directed to what was recuperator heat exchanger 410, but now becomes low-temperature gas turbine exhaust heat exchanger 410. The air flow entering the power cycle from reservoir 402 plus the combustion products gained in combustor 428 and duct burner 436, exit connection 2 of low-temperature gas turbine exhaust heat exchanger 410.

For added power, another expansion turbine could be added to this cycle taking a portion of the flow from expansion turbine 426 and expanding it down to atmospheric pressure and exiting the system at the exhaust connection of this added expansion turbine. While producing additional power, the mass flow of liquid air per unit of power generated increases. However, in certain situations, when peak power prices are unusually high, the economics may justify this additional expansion turbine.

The big advantage of using a gas turbine with its compressor removed as the primary heat and power source for the power cycle 400A of FIG. 4A compared to the power cycle 400 of FIG. 4 in which a complete gas turbine 432 is the primary heat and power source, is that the compressor of the gas turbine absorbs about half of the power generated in the expansion turbine of the gas turbine.

For most gas turbines, it is an engineering challenge to remove the air compressor, since most gas turbines used for power generation have a single shaft extending from the inlet end of the air compressor, through the center of the combustor section, to the end of the turbine section, with two bearings supporting the shaft, one at the compressor inlet end and the other at the turbine exhaust end. An exception is the Model SGT-A05 gas turbine from Siemens Energy of Germany, which is of modular design with two bearings supporting the turbine with a splined shaft connecting the turbine to the compressor, which is also supported by two bearings, making it much easier to separate the turbine and combustor from the compressor, recognizing that an air inlet section and thrust balance mechanism would need to be designed.

Note that, in the power cycle 400 of FIG. 4, the heat exchanged in heat exchanger 424 comes from the hot engine exhaust from the gas turbine 432, where the resulting cooled engine exhaust is exhausted to the atmosphere at connection 2 of the heat exchanger 424, while the air from LA reservoir 402 is exhausted to the atmosphere at connection 2 of heat exchanger 410 along with combustion products from the fuel burned in duct burner 428. In the power cycle 400A of FIG. 4A, on the other hand, the heat exchanged in heat exchanger 424 comes from the burning of fuel in duct burner 436, where the air in both combustor 428 and duct burner 436 comes from LA reservoir 402. In this case, the air exhausted to the atmosphere at connection 2 of heat exchanger 410 includes combustion products from both combustor 428 and duct burner 436.

Figure 5:
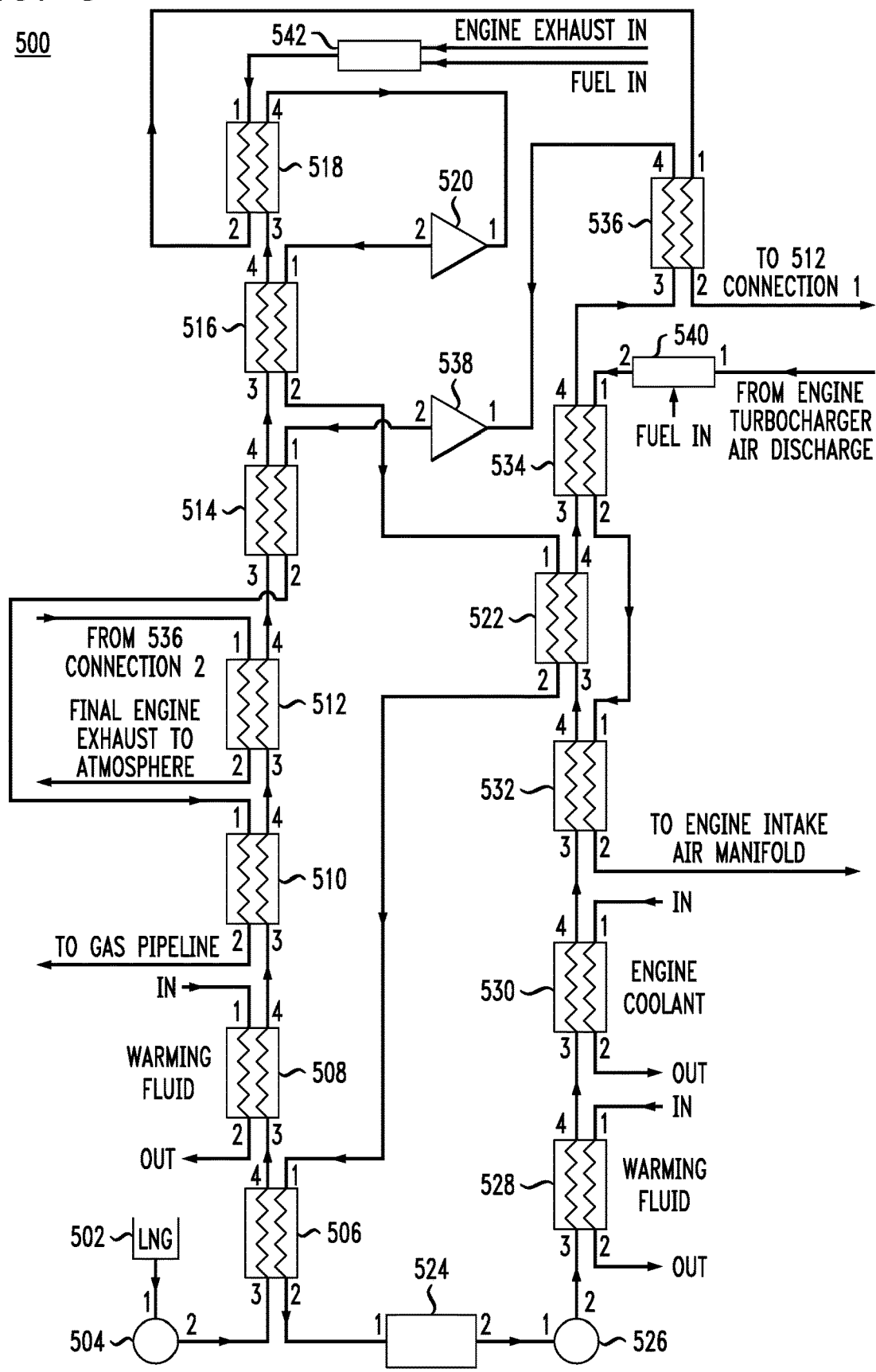
FIG. 5 is a diagram representing a power cycle according to yet another possible embodiment of the disclosure.

FIG. 5 is a diagram representing a power cycle 500 according to yet another possible embodiment of the disclosure. The power cycle 500 can be applied to a gas and electric energy storage system storing natural gas as LNG at times of excess gas and electric energy and returning both electric power to the grid and gas to the pipeline system at peak-demand times. In this embodiment, the exhaust from a reciprocating-type turbocharged engine (with its turbocharger in place and used) is the primary source of heat for the cycle, and air from the turbocharger air discharge connection, at about 45 psia and 450° F., which normally connects to the aftercooler which would cool the turbocharger air prior to entering the engine air intake manifold, is the secondary power cycle heat source. In this case, the aftercooler is bypassed, since the hot air from the turbocharger is returned to the engine air intake manifold, after transferring heat from the hot air stream to the power cycle, at a temperature equivalent to the normal air temperature from the aftercooler. The cycle also includes lower-temperature heat sources. Power cycle 500 includes the following sequence of devices and process steps: 502, 504, 506, 508, 510, 512, 514, 516, 518, 520, 522, 506, 524, 526, 528, 530, 532, 522, 534, 536, 538, 514, and 510.

Liquefied natural gas (LNG) in reservoir 502 is directed to pump 504, pumped to a supercritical pressure and directed to gasifying/condensing heat exchanger 506, then directed to warming heat exchanger 508 as a superheated supercritical fluid, leaving heat exchanger 508 at connection 4 with additional superheat, then directed to low-temperature recuperator heat exchanger 510 and heated again, then directed to low-temperature exhaust gas heat exchanger 512 receiving additional heat and directed to high-temperature recuperator heat exchanger 514, again receiving additional heat and directed to high-temperature recuperator heat exchanger 516, receiving additional heat and then directed to high-temperature exhaust gas heat exchanger 518 where the superheated supercritical fluid is heated to its highest temperature (typically between 700° F. and 1100° F.), and then directed to expansion turbine 520, producing power and a subcritical-pressure superheated fluid directed to above-mentioned high-temperature recuperator heat exchanger 516, where the fluid is cooled, then directed to low-temperature recuperator heat exchanger 522, where the fluid is further cooled then directed back to gasifying/condensing heat exchanger 506 where the fluid is re-condensed, directed to accumulator 524, then to pump 526 and pumped again to a supercritical pressure and directed to warming heat exchanger 528 which may be a condenser for an organic Rankine cycle. The fluid is heated in heat exchanger 528 as the organic Rankine cycle fluid is cooled and condensed. The heated fluid leaves heat exchanger 528 as a superheated supercritical fluid and directed to engine coolant heat exchanger 530, in which the engine coolant is cooled as the superheated supercritical fluid is heated and then directed to low-temperature turbocharger air heat exchanger 532 where the fluid is again heated to a still higher temperature then directed to the low-temperature recuperator heat exchanger 522, where additional heat is added to the fluid and then directed to high-temperature turbocharger air heat exchanger 534 where the fluid is again heated, and then directed to medium-temperature exhaust gas heat exchanger 536 where the re-condensed and pumped stream attains its highest temperature, leaving heat exchanger 536 and directed to the expansion turbine 538, where power is produced and the fluid temperature and pressure decreased as the fluid expands. The fluid then enters high-temperature recuperator heat exchanger 514, where the fluid is further cooled and directed to low-temperature recuperator heat exchanger 510, where the fluid is cooled to its final temperature as it exits the system, usually being directed to a natural gas pipeline.

The hot air from the air discharge connection of the turbocharged engine turbocharger enters the power cycle 500 at connection 1 of duct burner 540 wherein fuel is added and combustion takes place raising the temperature of the air and adding some combustion products to the stream of air. The air stream with combustion products exits the duct burner 540 at connection 2 and enters connection 1 of the high-temperature turbocharger heat exchanger 534, exiting at connection 2 and directed to connection 1 of low-temperature turbocharger heat exchanger 532. The turbocharger air with a small amount of combustion products exits connection 2 of low-temperature turbocharger air heat exchanger 532 and is directed back to the engine air intake manifold.

The exhaust stream from the exhaust connection of the turbocharger of the turbocharged engine enters the power cycle 500 at connection 1 of duct burner 542 where fuel is added to the exhaust stream increasing the temperature of the stream as the fuel is combusted. The heated exhaust gas stream, with the added products of combustion, is directed to the hot exhaust gas heat exchanger 518, leaving as a medium-temperature exhaust gas stream and directed to the medium exhaust gas heat exchanger 536, where the exhaust gas stream is further cooled, leaving heat exchanger 536 as a low-temperature exhaust gas stream and directed to the low-temperature exhaust gas heat exchanger 512, where the exhaust gas stream is cooled to its lowest temperature, exiting the power cycle 500 at connection 2 of heat exchanger 512.

The embodiment of FIG. 5 would also work well with an intercooled gas turbine, such as the Model LMS100 turbine of General Electric of Boston, Mass., in which the gas turbine exhaust would replace the engine exhaust, and the hot air discharging from the gas turbine's first-stage air compressor would replace the turbocharger air.

The two duct burners 540 and 542 improve the economic performance but usually cause an increase in fuel rate, and their inclusion in the system would depend on economic considerations. Without duct burner 540, heat exchanger 534 might not add to the system's performance. If heat exchanger 534 is omitted, then the air (whether from an engine or gas turbine first-stage compressor) would enter at connection 1 of heat exchanger 532.

The hot air supplied from the turbocharger air discharge to connection 1 of duct burner 540, or connection 1 of heat exchanger 534 if the duct burner 540 is not used, could come from both (i) the engine supplying the hot exhaust to duct burner 542 and (ii) the turbocharger air discharge from one or more other engines such as one or more engines supplying exhaust heat to an ORC and/or supplying exhaust heat to both an ORC and to power cycle 500. The air would be returned to these engines from connection 2 of heat exchanger 532. This same concept could be applied when an intercooled gas turbine (as mentioned above) is the source of exhaust heat and hot air.

The need for low-temperature recuperator heat exchanger 510 is dependent on the temperature of the gas stream exiting connection 2 of heat exchanger 514. At temperatures below approximately 100° F., heat exchange 510 provides little or no benefit.

The warming fluid in heat exchangers 508 and 528, transiting from connection 1 to connection 2, is usually ambient air; warming water, such as water from an ocean, river, lake, cooling tower, etc.; or a working fluid from a Rankine or other heat-to-power cycle, in which case, the cold in the gasified superheated supercritical fluid is used to cool or cool and re-condense the working fluid as it heats the superheated supercritical fluid.

The heat provided by duct burner 540 could instead be supplied by a heat exchanger using heat from another source, particularly from a hot molten salt heated with off-peak electric energy. This would avoid adding combustion gases to the air stream returned to the engine (or gas turbine).

Those with ordinary skill in the art would recognize that there are other places in the power cycle 500 where heat from other sources could be used to improve the cycle performance, and this embodiment is not limited to using only the heat sources shown in the diagram or using the heat at only the points shown in the diagram.

The embodiment of FIG. 5 could be used as a liquid air energy system using liquid air as the fluid in reservoir 502. In the liquid air mode, the expansion in expansion turbine 538 would probably be handled in two stages of expansion in series with a heat source, such as a duct burner or molten salt heat exchanger, heating the air stream between the expansion stages.

For all of the above embodiments, a control system (not shown in the figures) with one or more of control valves, relief valves, back pressure valves, recycle valves, controllers, orifices, sensors, instrumentation, gas treating systems, etc., as known to one of ordinary skill in the art is used to control the pressure, temperature, cleanliness, and flows of the fluids in the systems.

Suitable gasifying/condensing heat exchangers for the various embodiments of this disclosure include, but are not limited to, coil-wound heat exchangers and brazed aluminum heat exchangers commonly used in air separation plants and LNG plants. Suitable expansion turbines for the various embodiments of this disclosure include, but are not limited to, radial inflow turbines and bladed turbines similar to typical reaction or impulse steam turbines except designed to handle natural gas or air, instead of steam.

In at least some situations, the term "to condense" means to change the phase state of a fluid from a beginning gas or supercritical phase into a liquid end phase.

In at least some situations, the term "combustion turbine" means a heat-to-power device consisting essentially of a combustor flow connected to a high-temperature expansion turbine with the combustor designed to (i) accept a stream of high-pressure air (between a range of 100 to 2000 psia) at its inlet, (ii) combust the air stream with fuel injected into the combustor, and (iii) discharge the hot combusted stream to the expansion turbine, where power is produced as the hot combusted stream expands to the discharge pressure of the expansion turbine which is typically near atmospheric pressure.

In at least some situations, the term "expansion turbine" means any of various devices that convert the energy in a stream of a gaseous or supercritical fluid into mechanical energy. At times, the term "expansion turbine" is used rather than just the term "turbine" to indicate that the fluid transiting the turbine expands in volume, compared to a turbine handling a liquid in which case there is no volume change across the turbine.

In at least some situations, the term "to gasify" means to change a fluid, by means of heating, from a liquid fluid to a gaseous or supercritical fluid.

In at least some situations, the term "gas turbine" means a combustion turbine but also including an air compressor to provide the pressurized air to the combustor.

In at least some situations, the term "liquefied natural gas" or "LNG" is natural gas that has been liquefied after treating to remove components that would damage or plug up the liquefaction equipment. LNG is typically mostly methane with a few percent ethane, even less propane and butane, and trace amounts of nitrogen.

In at least some situations, the term "mostly methane stream" means a fluid stream consisting of LNG in either the liquid, gaseous, or supercritical state.

In at least some situations, the term "supercritical fluid" means a fluid in which both the pressure and temperature are above the critical pressure and critical temperature of the fluid.

In certain embodiments, the present disclosure is a method for producing power using a fluid in a cold condensed state. The method comprises: (a) pumping the fluid to form initially pumped fluid; (b) heating the initially pumped fluid to form initially heated fluid; (c) expanding the initially heated fluid in a first expansion device to form initially expanded fluid; (d) re-condensing the initially expanded fluid against the initially pumped fluid to form re-condensed fluid in a liquid state; (e) pumping the re-condensed fluid to form re-pumped fluid; (f) heating the re-pumped fluid to form re-heated fluid; and (g) expanding the re-heated fluid in a second expansion device to form re-expanded fluid, wherein at least one of the first and second expansion devices is used to generate power.

In at least some of the above embodiments, the first and second expansion devices are used to drive generators to produce electrical energy.

In at least some of the above embodiments, the initially expanded fluid is re-condensed against the initially pumped fluid in a gasifying/condensing heat exchanger.

In at least some of the above embodiments, the initially pumped fluid enters the gasifying/condensing heat exchanger at a supercritical pressure and leaves the gasifying/condensing heat exchanger as a superheated supercritical fluid; and the initially expanded fluid enters the gasifying/condensing heat exchanger as a superheated fluid at a sub-critical pressure and leaves the gasifying/condensing heat exchanger as the re-condensed fluid.

In at least some of the above embodiments, step (a) comprises pumping the fluid to form the initially pumped fluid above the critical pressure of the fluid; and step (e) comprises pumping the fluid to form the re-pumped fluid above the critical pressure of the fluid.

In at least some of the above embodiments, step (f) comprises heating the re-pumped fluid using heat in an exhaust stream from a turbocharged engine without the exhaust stream passing through a turbocharger.

In at least some of the above embodiments, the fluid is air; and at least a portion of the re-expanded air is returned to the turbocharged engine as combustion air without passing through the turbocharger.

In at least some of the above embodiments, step (f) comprises heating the re-pumped fluid using exhaust heat from an intercooled gas turbine without using a first-stage air compressor of the turbine.

In at least some of the above embodiments, the fluid is air; and at least a portion of the re-expanded air is applied to a second-stage compressor air intake of the intercooled gas turbine.

In at least some of the above embodiments, at least one of steps (b) and (f) comprises heating fluid using a hot exhaust stream from a turbocharged engine; and at least one of steps (b) and (f) comprises heating fluid using an air discharge stream from the turbocharged engine turbocharger air discharge, wherein at least some air is returned to the turbocharged engine air intake manifold bypassing an aftercooler of the turbocharged engine.

In at least some of the above embodiments, at least one of steps (b) and (f) comprises heating fluid using a hot exhaust stream from an intercooled gas turbine; and at least one of steps (b) and (f) comprises heating fluid using an air discharge stream from the intercooled gas turbine first compressor stage air discharge, wherein at least some air is returned to the gas turbine bypassing a first-stage air compressor and intercooler of the gas turbine.

In at least some of the above embodiments, the fluid is air; and at least one of steps (c) and (g) comprises expanding using a gas turbine without using a compressor of the gas turbine.

In at least some of the above embodiments, the liquid is natural gas for applications of combined gas and electrical energy storage.

In certain embodiments, the present disclosure is a power cycle for producing power using a fluid in a cold condensed state. The power cycle comprises a first pump configured to pump the fluid to form initially pumped fluid; one or more first heat exchangers configured to heat the initially pumped fluid to form initially heated fluid; a first expansion device configured to expand the initially heated fluid to form initially expanded fluid; a gasifying/condensing heat exchanger configured to re-condense the initially expanded fluid against the initially pumped fluid to form re-condensed fluid in a liquid state; a second pump configured to pump the re-condensed fluid to form re-pumped fluid; one or more second heat exchangers configured to heat the re-pumped fluid to form re-heated fluid; and a second expansion device configured to expand the re-heated fluid to form re-expanded fluid, wherein at least one of the first and second expansion devices is used to generate power.

In at least some of the above embodiments, the power cycle further comprises a turbocharged engine configured to be used without a turbocharger to generate exhaust heat used to heat the re-pumped fluid.

In at least some of the above embodiments, the power cycle further comprises an intercooled gas turbine configured to be used without using a first-stage air compressor of the turbine to generate exhaust heat used to heat the re-pumped fluid.

In at least some of the above embodiments, the power cycle further comprises a turbocharged engine configured to generate (i) a hot exhaust stream used to heat at least one of the initially pumped fluid and the re-pumped fluid and (ii) an air discharge stream used to heat at least one of the initially pumped fluid and the re-pumped fluid, wherein the power cycle is configured to return at least some air to the turbocharged engine air intake manifold bypassing an aftercooler of the turbocharged engine.

In at least some of the above embodiments, the power cycle further comprises an intercooled gas turbine configured to generate (i) a hot exhaust stream used to heat at least one of the initially pumped fluid and the re-pumped fluid and (ii) an air discharge stream used to heat at least one of the initially pumped fluid and the re-pumped fluid, wherein the power cycle is configured to return at least some air to the turbine bypassing an aftercooler of the turbine.

In at least some of the above embodiments, the fluid is air; and at least one of the first and second expansion devices is a gas turbine configured to be used without a compressor.

In at least some of the above embodiments, the liquid is natural gas for applications of combined gas and electrical energy storage.

Also for purposes of this disclosure, the terms "couple," "coupling," "coupled," "connect," "connecting," or "connected" refer to any manner known in the art or later developed in which a flow or stream of fluid is allowed to be transferred usually by a pipe between two or more elements, and the interposition of one or more additional elements and pipes is contemplated, although not required. Conversely, the terms "directly coupled," "directly connected," etc., imply the absence of such additional elements and pipes. As used herein, the term "heat transfer" refers to the transfer of thermal energy from one substance to another substance.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A method for producing power using an initial fluid in a cold condensed state, the method comprising:
   (a) pumping fluid derived from the initial fluid to form pumped fluid at above the fluid's critical pressure;
   (b) heating fluid derived from the pumped fluid to form heated fluid;
   (c) expanding fluid derived from only the heated fluid in at least one power-producing expansion step to form expanded fluid;

(d) cooling and re-condensing fluid derived from the expanded fluid against only the pumped fluid in a heat exchanger to form re-condensed fluid in a liquid state, wherein the re-condensing of the fluid derived from the expanded fluid provides heat to gasify the pumped fluid in the heat exchanger;

(e) pumping fluid derived from the re-condensed fluid to form re-pumped fluid;

(f) heating fluid derived from the re-pumped fluid to form re-heated fluid; and (g) expanding fluid derived from the re-heated fluid in at least one power-producing expansion step to form re-expanded fluid.

2. The method of claim 1, wherein, in step (d), the fluid derived from the expanded fluid is cooled and re-condensed against only the fluid derived from the pumped fluid in a gasifying/condensing heat exchanger.

3. The method of claim 2, wherein:
the fluid derived from the pumped fluid enters the gasifying/condensing heat exchanger at a supercritical pressure and leaves the gasifying/condensing heat exchanger as superheated supercritical fluid; and
the fluid derived from the expanded fluid enters the gasifying/condensing heat exchanger as superheated fluid at a sub-critical pressure and leaves the gasifying/condensing heat exchanger as only the re-condensed fluid.

4. The method of claim 1, wherein:
step (e) comprises pumping the fluid derived from the re-condensed fluid to form the re-pumped fluid above the critical pressure of the fluid.

5. The method of claim 1, wherein at least one of (i) the fluid derived from the pumped fluid of step (a) and (ii) the fluid derived from the re-pumped fluid of step (e) is heated using heat derived from an exhaust stream from a turbocharged engine without the exhaust stream passing through a turbocharger.

6. The method of claim 5, wherein:
the fluid is air; and
at least a portion of the re-expanded air is returned to the turbocharged engine as combustion air without passing through the turbocharger.

7. The method of claim 1, wherein at least one of (i) the fluid derived from the pumped fluid of step (a) and (ii) the fluid derived from the re-pumped fluid of step (e) is heated using exhaust heat from an intercooled gas turbine without using a first-stage air compressor of the turbine.

8. The method of claim 7, wherein:
the fluid is air; and
at least a portion of the re-expanded air is applied to a second-stage compressor air intake of the intercooled gas turbine.

9. The method of claim 1, wherein:
at least one of steps (b) and (f) comprises heating fluid using a hot exhaust stream from a turbocharged engine; and
at least one of steps (b) and (f) comprises heating fluid using an air discharge stream from the turbocharged engine turbocharger air discharge, wherein at least some air is returned to the turbocharged engine air intake manifold bypassing an aftercooler of the turbocharged engine.

10. The method of claim 1, wherein:
at least one of steps (b) and (f) comprises heating fluid using a hot exhaust stream from an intercooled gas turbine; and at least one of steps (b) and (f) comprises heating fluid using an air discharge stream from the intercooled gas turbine first compressor stage air discharge, wherein at least some air is returned to the gas turbine bypassing an intercooler of the gas turbine.

11. The method of claim 1, wherein:
the fluid is air; and
at least one of steps (c) and (g) comprises expanding using a gas turbine without using a compressor of the gas turbine.

12. The method of claim 1, wherein the initial fluid in a cold condensed state is liquified natural gas (LNG) for applications of combined gas and electrical energy storage or LNG regasification.

13. The method of claim 1, wherein all of the re-condensed fluid from step (d) flows to the pumping of step (e) without being separated into multiple streams.

14. The method of claim 1, wherein the method re-condenses the fluid derived from the expanded fluid against the initially pumped fluid to form the re-condensed fluid in a liquid state without using an external coolant stream.

15. The method of claim 1, further comprising one or more cooling steps after the expanding of step (c) and prior to the cooling and re-condensing of step (d) with some of the heat from the one or more cooling steps being returned to a power cycle corresponding to the method.

16. The method of claim 1, further comprising one or more cooling steps after expanding of step (g) with some of the heat from the one or more cooling steps being returned to a power cycle corresponding to the method.

17. The method of claim 1, wherein the initial fluid in a cold condensed state is liquid air.

18. A power cycle for producing power using an initial fluid in a cold condensed state, the power cycle comprising:
a first pump configured to pump fluid derived from the initial fluid to form pumped fluid at above the fluid's critical pressure;
one or more first heat exchangers configured to heat fluid derived from the pumped fluid to form heated fluid;
at least one first power-producing expansion device configured to expand fluid derived from only the heated fluid to form expanded fluid, wherein the one or more first heat exchangers comprise a gasifying/condensing heat exchanger configured to cool and re-condense fluid derived from the expanded fluid against only the pumped fluid to form re-condensed fluid in a liquid state;
a second pump configured to pump fluid derived from the re-condensed fluid to form re-pumped fluid;
one or more second heat exchangers and/or at least one duct burner configured to heat fluid derived from the re-pumped fluid to form re-heated fluid; and
at least one second power-producing expansion device configured to expand fluid derived from the re-heated fluid to form re-expanded fluid.

19. The power cycle of claim 18, further comprising a turbocharged engine configured to be used without a turbocharger to generate exhaust heat used to heat at least one of (i) the fluid derived from the pumped fluid and (ii) the fluid derived from the re-pumped fluid.

20. The power cycle of claim 18, further comprising an intercooled gas turbine configured to be used without using a first-stage air compressor of the turbine to generate exhaust heat used to heat at least one of (i) the fluid derived from the pumped fluid and (ii) the fluid derived from the re-pumped fluid.

21. The power cycle of claim 18, further comprising a turbocharged engine configured to generate (i) a hot exhaust stream used to heat at least one of (a) the fluid derived from the pumped fluid and (b) the fluid derived from the re-pumped fluid and (ii) an air discharge stream from the turbocharged engine turbocharger air discharge used to heat at least one of (a) the fluid derived from the pumped fluid and (b) the fluid derived from the re-pumped fluid, wherein the power cycle is configured to return at least some air to the turbocharged engine air intake manifold bypassing an aftercooler of the turbocharged engine.

22. The power cycle of claim 18, further comprising an intercooled gas turbine configured to generate (i) a hot exhaust stream used to heat at least one of the fluid derived from the pumped fluid and the fluid derived from the re-pumped fluid and (ii) an air discharge stream from the gas turbine first stage air compressor discharge used to heat at least one of the fluid derived from the pumped fluid and the fluid derived from the re-pumped fluid, wherein the power cycle is configured to return at least some air to the turbine bypassing an aftercooler of the turbine.

23. The power cycle of claim 18, wherein:
the fluid is air; and
at least one of the first and second expansion devices is a gas turbine configured to be used without a compressor.

24. The power cycle of claim 18, wherein the initial fluid in a cold condensed state is liquified natural gas (LNG) for applications of combined gas and electrical energy storage or LNG regasification.

25. The power cycle of claim 18, wherein the gasifying/condensing heat exchanger and the second pump are configured such that all of the re-condensed fluid flows from the gasifying/condensing heat exchanger to the second pump without being separated into multiple streams.

26. The power cycle of claim 18, wherein the power cycle is configured to re-condense the expanded fluid against the fluid derived from the pumped fluid to form the re-condensed fluid in a liquid state without using an external coolant stream.

27. The power cycle of claim 19, wherein:
the fluid is air; and
at least a portion of the re-expanded air is returned to the turbocharged engine as combustion air without passing through the turbocharger.

28. The power cycle of claim 20, wherein:
the fluid is air; and
at least a portion of the re-expanded air is applied to a second-stage compressor air intake of the intercooled gas turbine.

29. The power cycle of claim 18, further comprising, between the at least one first power-producing expansion device and the gasifying/condensing heat exchanger, one or more additional heat exchangers configured to cool fluid derived from the expanded fluid to form cooled fluid, wherein:
some of the heat from the one or more additional heat exchangers is returned to the power cycle; and
the gasifying/condensing heat exchanger is configured to additionally cool and re-condense fluid derived from the cooled fluid against only the pumped fluid to form the re-condensed fluid in the liquid state.

30. The power cycle of claim 18, further comprising, after the at least one second power-producing expansion device, one or more additional heat exchangers configured to cool fluid derived from the re-expanded fluid, wherein some of the heat from the one or more additional heat exchangers is returned to the power cycle.

31. The power cycle of claim 18, wherein the initial fluid in a cold condensed state is liquid air.

32. A method for producing power using an initial fluid in a cold condensed state, the method comprising:
(a) pumping fluid derived from the initial fluid to form pumped fluid at above the fluid's critical pressure;
(b) heating fluid derived from the pumped fluid to form heated fluid;
(c) expanding fluid derived from only the heated fluid in at least one power-producing expansion step to form expanded fluid;
(d) cooling fluid derived from the expanded fluid against the fluid derived from the pumped fluid to form re-condensed fluid in a liquid state;
(e) pumping fluid derived from the re-condensed fluid to form re-pumped fluid;
(f) heating fluid derived from the re-pumped fluid to form re-heated fluid; and
(g) expanding fluid derived from the re-heated fluid in at least one power-producing expansion step to form re-expanded fluid, wherein:
in step (d), the fluid derived from the expanded fluid is re-condensed against the fluid derived from the pumped fluid in a gasifying/condensing heat exchanger;
the fluid derived from the pumped fluid enters the gasifying/condensing heat exchanger at a supercritical pressure and leaves the gasifying/condensing heat exchanger as a superheated supercritical fluid; and
the fluid derived from the expanded fluid enters the gasifying/condensing heat exchanger as superheated fluid at a sub-critical pressure and leaves the gasifying/condensing heat exchanger as only the re-condensed fluid.

* * * * *